(12) United States Patent
Young et al.

(10) Patent No.: US 11,062,573 B2
(45) Date of Patent: Jul. 13, 2021

(54) USING A FLUIDIC MECHANISM ON A WEARABLE DEVICE FOR BOTH HAPTIC FEEDBACK AND USER INPUT

(71) Applicant: FACEBOOK TECHNOLOGIES, LLC, Menlo Park, CA (US)

(72) Inventors: Eric Young, Redmond, WA (US); Priyanshu Agarwal, Kirkland, WA (US); Nicholas Colonnese, Redmond, WA (US); Amirhossein Hajiagha Memar, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/855,833

(22) Filed: Apr. 22, 2020

(65) Prior Publication Data

US 2020/0250942 A1    Aug. 6, 2020

Related U.S. Application Data

(63) Continuation of application No. 16/264,359, filed on Jan. 31, 2019, now Pat. No. 10,636,260.

(51) Int. Cl.
| | | |
|---|---|---|
| *G09G 5/00* | (2006.01) | |
| *G08B 6/00* | (2006.01) | |
| *A63F 13/285* | (2014.01) | |

(52) U.S. Cl.
CPC ............. *G08B 6/00* (2013.01); *A63F 13/285* (2014.09)

(58) Field of Classification Search
CPC ................................ G08B 6/00; A63F 13/285

USPC ........................................................ 345/633
See application file for complete search history.

(56) References Cited

U.S. PATENT DOCUMENTS

| | | | | |
|---|---|---|---|---|
| 9,552,707 | B1* | 1/2017 | Bala ....................... | G04C 21/00 |
| 9,781,984 | B2* | 10/2017 | Baranski ............... | A44C 5/0069 |
| 10,546,471 | B1* | 1/2020 | West ....................... | G06F 3/016 |
| 2007/0060786 | A1* | 3/2007 | Gura ...................... | F04B 43/082 |
| | | | | 600/16 |
| 2012/0182135 | A1* | 7/2012 | Kusuura ................... | G06F 3/00 |
| | | | | 340/407.1 |
| 2014/0314976 | A1* | 10/2014 | Niiyama ............. | H04M 1/0202 |
| | | | | 428/34.3 |

(Continued)

OTHER PUBLICATIONS

Young, Office Action, U.S. Appl. No. 16/264,359, dated Nov. 25, 2019, 15 pgs.

(Continued)

*Primary Examiner* — Zhen Y Wu
(74) *Attorney, Agent, or Firm* — Morgan, Lewis & Bockius LLP

(57) ABSTRACT

A method for executing commands includes a wearable device with an inflatable bladder and a sensor integrated with the inflatable bladder. The method includes transitioning the inflatable bladder from an unpressurized state to a pressurized state. The inflatable bladder is associated with an executable command when in the pressurized state. The method further includes detecting, by the sensor, the magnitude of depression of the inflatable bladder and determining whether the magnitude of depression satisfies a predetermined threshold. When the magnitude of depression satisfies the predetermined threshold, the method executes the executable command.

20 Claims, 19 Drawing Sheets

(56) References Cited

U.S. PATENT DOCUMENTS

| | | | |
|---|---|---|---|
| 2015/0286277 A1* | 10/2015 | Kim | G06F 3/015 |
| | | | 345/156 |
| 2016/0255944 A1* | 9/2016 | Baranski | A44C 5/20 |
| 2016/0363997 A1* | 12/2016 | Black | G06F 3/016 |
| 2017/0065872 A1* | 3/2017 | Kelley | A63B 71/0622 |
| 2017/0300115 A1* | 10/2017 | Kerr | G06F 3/011 |
| 2018/0098583 A1* | 4/2018 | Keller | A41D 19/0024 |
| 2018/0184925 A1* | 7/2018 | Tokko | A61B 5/02233 |
| 2018/0190087 A1* | 7/2018 | Maalouf | G06F 3/014 |
| 2018/0328808 A1* | 11/2018 | Jourdan | G06F 3/014 |
| 2018/0356888 A1* | 12/2018 | Rihn | G06F 1/163 |
| 2019/0004602 A1* | 1/2019 | Holbery | A63F 13/285 |
| 2019/0076033 A1* | 3/2019 | Sweeney | A61B 5/0022 |
| 2019/0101959 A1* | 4/2019 | Fukuma | A61B 5/00 |
| 2019/0104953 A1* | 4/2019 | Narasimhan | A61B 5/7235 |
| 2019/0179412 A1* | 6/2019 | Penmatcha | G06F 3/0346 |
| 2019/0289934 A1* | 9/2019 | Lee | B25J 9/142 |
| 2019/0290202 A1* | 9/2019 | Di Pardo | A61B 5/4561 |
| 2019/0331539 A1* | 10/2019 | Li | H01H 13/803 |
| 2020/0371593 A1* | 11/2020 | Ara Jo | G06F 3/016 |

OTHER PUBLICATIONS

Young, Notice of Allowance, U.S. Appl. No. 16/264,359, dated Mar. 11, 2020, 11 pgs.

\* cited by examiner

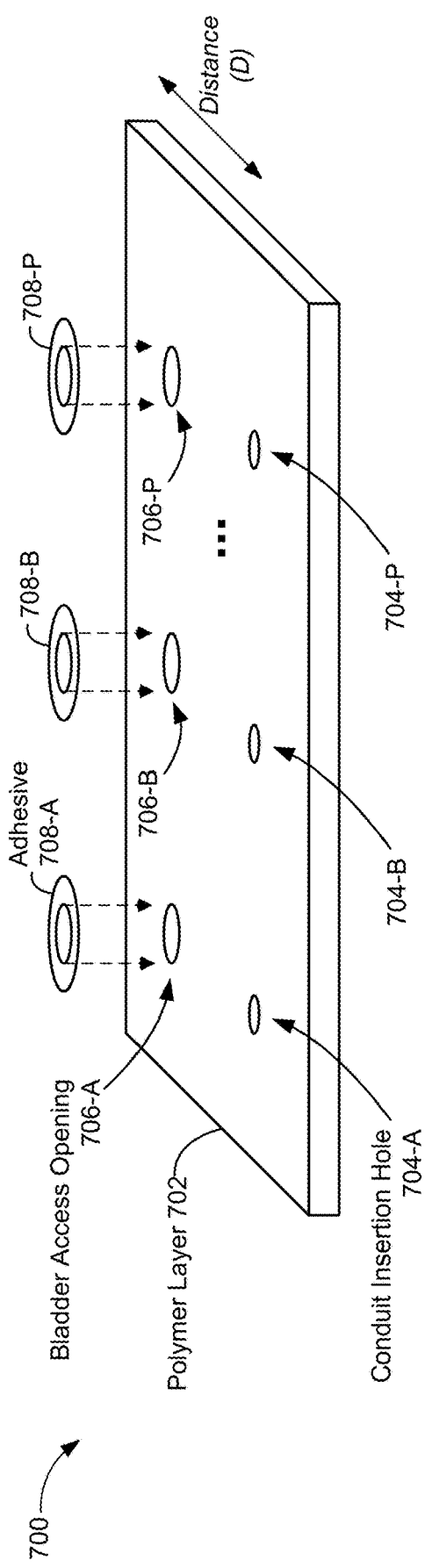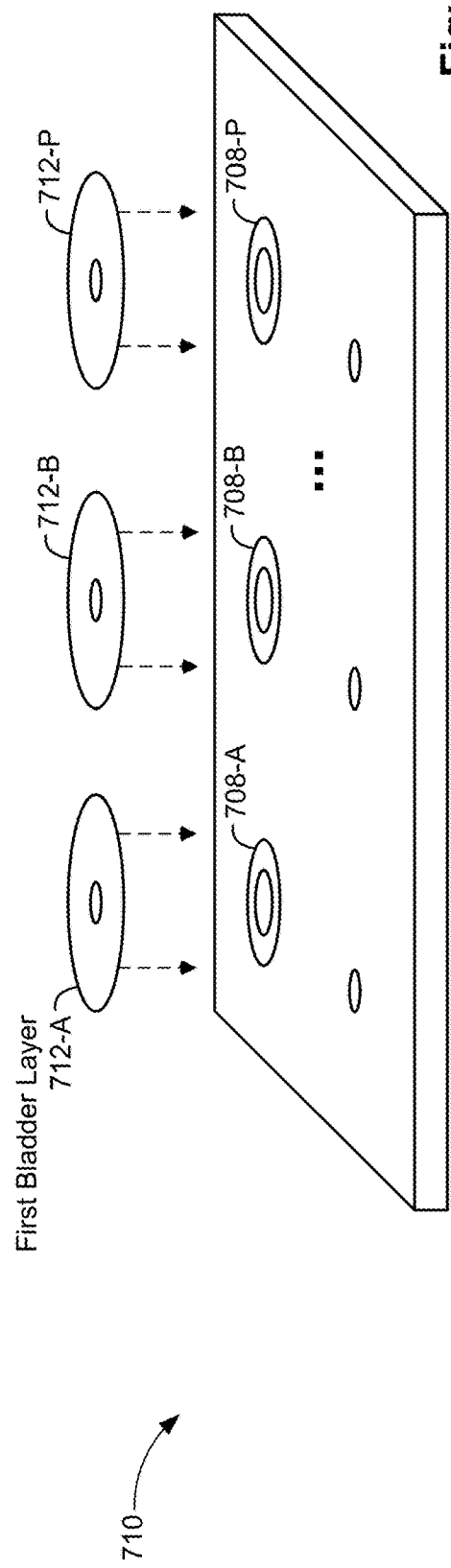

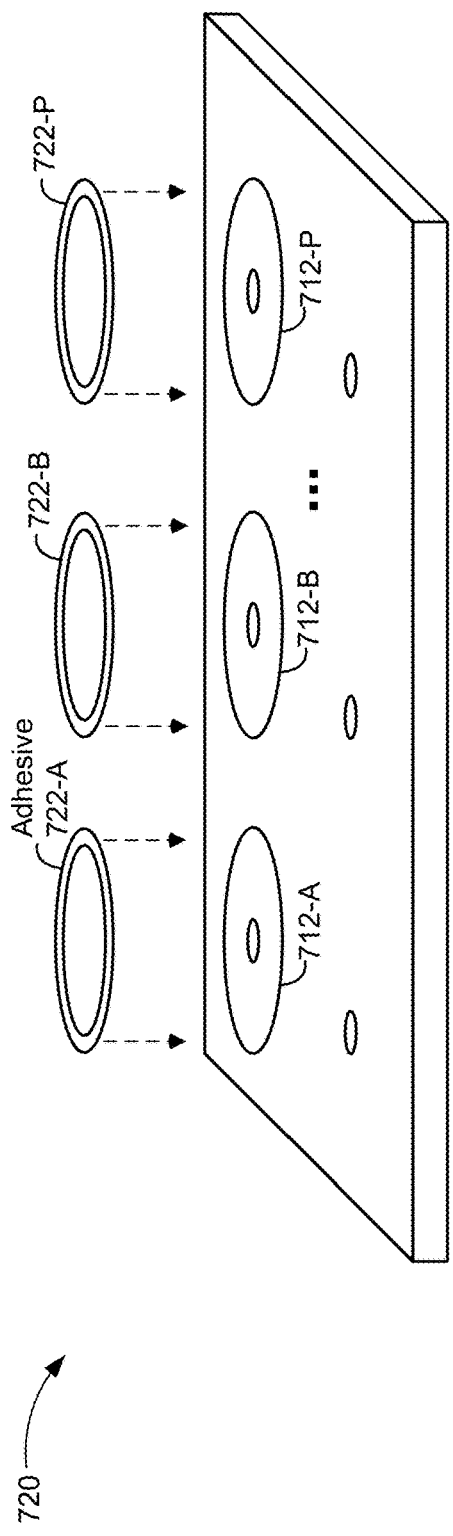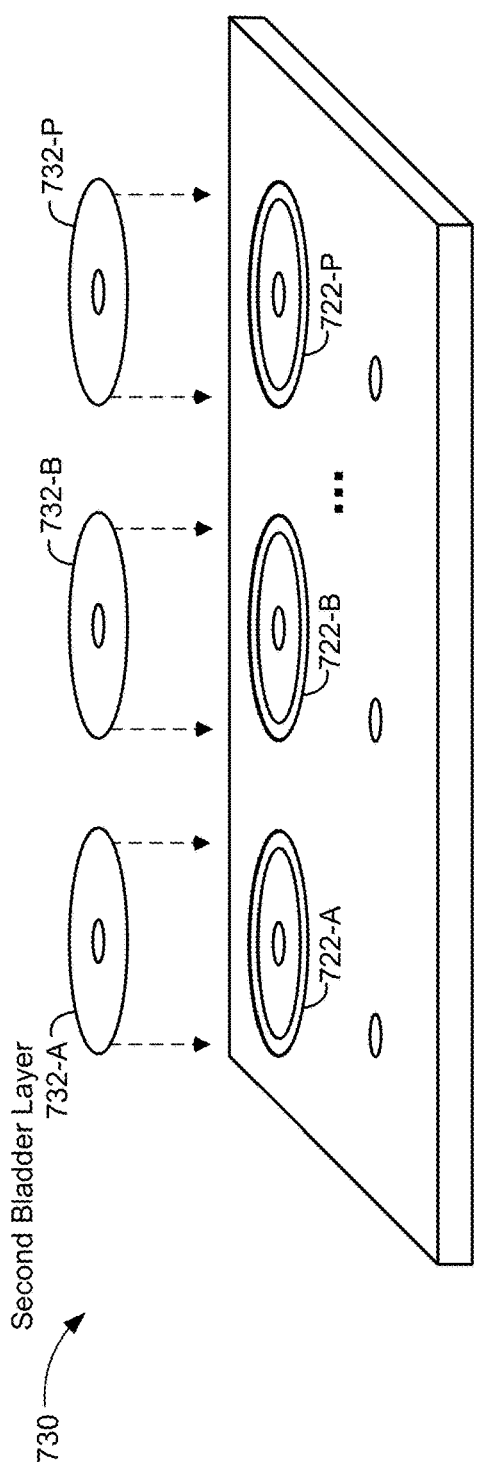

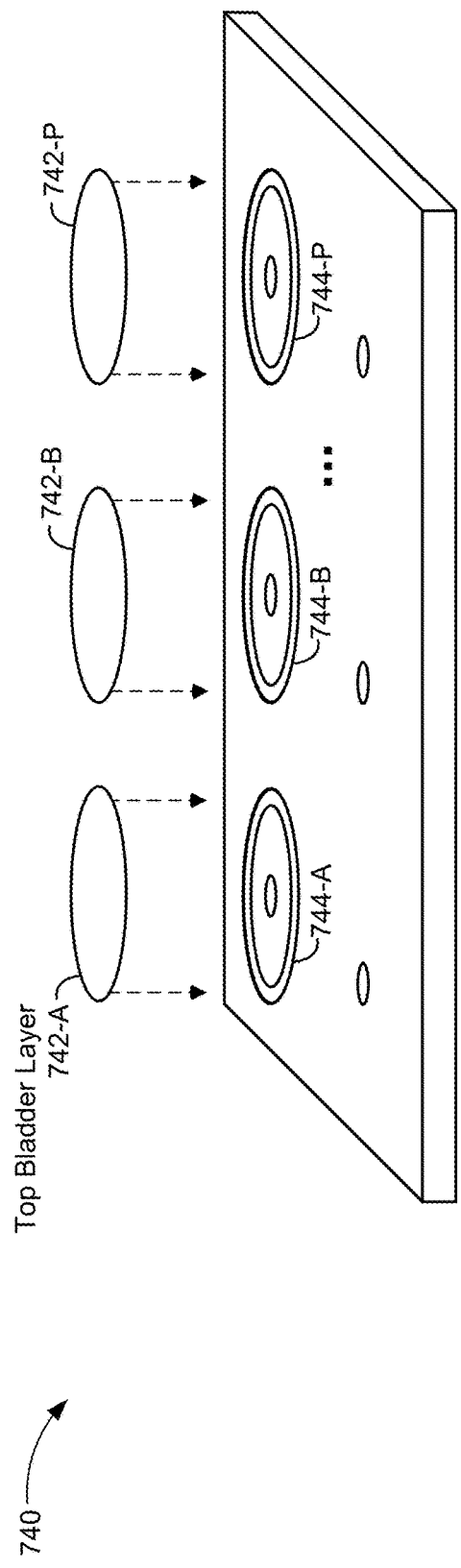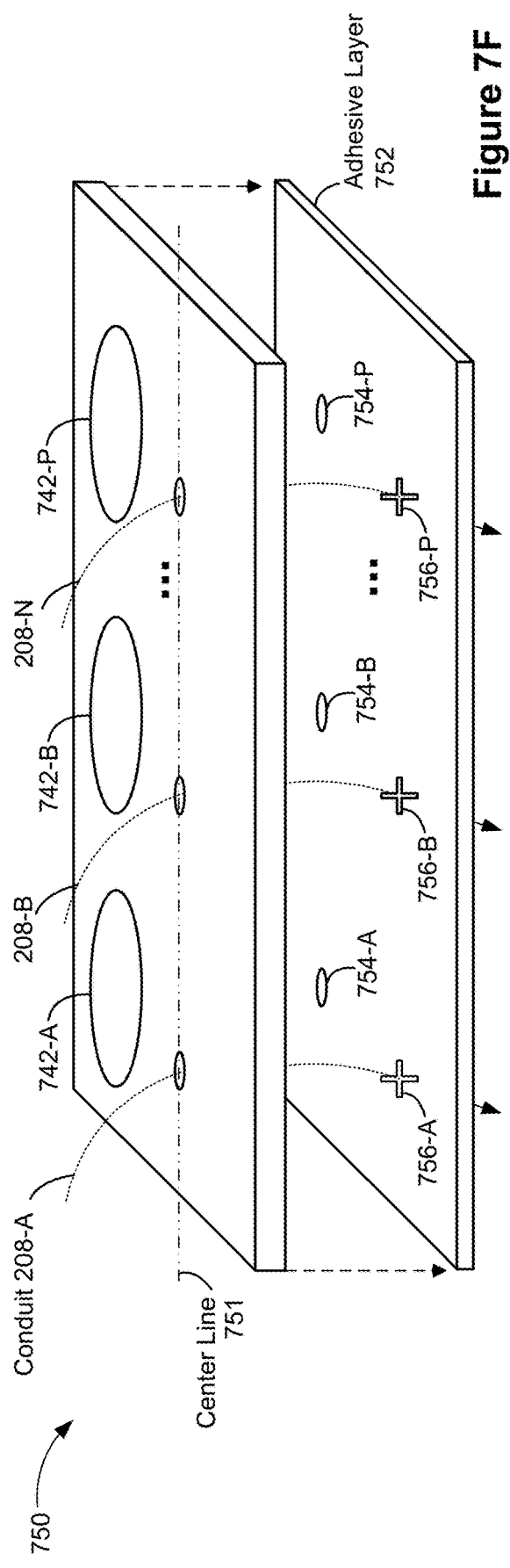

USING A FLUIDIC MECHANISM ON A WEARABLE DEVICE FOR BOTH HAPTIC FEEDBACK AND USER INPUT

RELATED APPLICATIONS

This application is a continuation of U.S. patent application Ser. No. 16/264,359, entitled "Wearable Devices with Fluidic Mechanisms," filed Jan. 31, 2019, which is incorporated by reference herein in its entirety.

TECHNICAL FIELD

This application relates generally to haptic stimulation, including creating haptic stimulations on users of virtual-reality, augmented-reality, and/or mixed-reality devices.

BACKGROUND

Virtual-reality and augmented-reality devices have wide applications in various fields, including engineering design, medical surgery practice, military simulated practice, and video gaming. Haptic or kinesthetic stimulations recreate the sense of touch by applying forces, vibrations, and/or motions to a user, and are frequently implemented with virtual-reality and augmented-reality devices. In certain applications, haptic stimulations are desired at locations where dexterity and motion of the user cannot be constrained. Conventional haptic feedback creating devices, however, are cumbersome and therefore detract from the user experience.

SUMMARY

Accordingly, there is a need for devices and systems that can create haptic stimulations on a user without constraining dexterity and motion of the user. One solution is a wearable device that includes novel haptic mechanisms. The haptic mechanism includes one or more inflatable bladders that are configured to expand and contract according to fluid pressure within each bladder. Each bladder is made from flexible, durable materials that do not encumber the user but are still able to create adequate haptic stimulations. Further, the bladders are airtight so that a pressure inside the bladders can be varied to create various haptic stimulations (e.g., a bladder can transition rapidly between unpressurized and pressurized states, or vice versa). By changing the pressure, a respective bladder can go from being unpressurized and unnoticed, to being pressurized, and it is this transition that creates the haptic stimulations felt by the user (e.g., the bladder presses and/or vibrates against the user's body). Importantly, the haptic stimulations felt by the user can correspond to media presented to the user by an artificial-reality system (e.g., virtual-reality or augmented-reality devices). In some embodiments, the inflatable bladders can also be used to improve a wearable devices coupling (e.g., fit) to a user.

(A1) In some embodiments, the solution explained above can be implemented on a wearable device that includes: (i) a wearable structure attachable to a portion of a user's body, (ii) a plurality of bladders, integrated with the wearable structure, configured to expand and contract according to fluid pressure within each bladder, and (iii) at least one conduit configured to transport a fluid from a source to one or more bladders of the plurality of bladders, where the fluid from the source increases the fluid pressure within the one or more bladders. In some embodiments, each bladder of the plurality of bladders delivers (e.g., imparts) a haptic stimulation to the user wearing the wearable structure when the bladder expands a threshold amount (and/or vibrates by expanding and contracting at a threshold frequency, such as at least 5 Hz), (A2) In accordance with some embodiments, a method is provided. The method is performed by the wearable device of (A1). The method includes receiving an instruction from a computer system (e.g., from the computer system 130 in FIG. 1) to change fluid pressure in one or more first bladders of the plurality of bladders. The instruction from the computer system corresponds to media presented to the user by the computer system. The method further includes, in response to receiving the instruction, activating a pressure source to change the fluid pressure in the one or more first bladders according to the instruction. In some embodiments, each of the one or more first bladders delivers (e.g., imparts) a haptic stimulation to the user wearing the wearable structure when each bladder expands a threshold amount (and/or vibrates at a threshold frequency). To further illustrate, the wearable device of (A1) can be in communication with a computer system (e.g., an augmented-reality device and/or a virtual-reality device, such as the devices described in FIGS. 10 and 11), and the wearable device can stimulate the body based on an instruction from the computer system. As an example, the computer system may display media content to a user (e.g., via a head-mounted display), and the computer system may also instruct the wearable device to create haptic stimulations that correspond to the media content displayed to the user and/or other information collected by the wearable device (e.g., via sensors included with the wearable device) and/or the head-mounted display. In some embodiments, the computer system activates the pressure source instead of the wearable device.

(A3) In some embodiments of any of A1 or A2, a respective bladder includes: (i) a first bellows coupled to the wearable structure, and (ii) a second bellows, positioned on top of the first bellows, configured to contact the user wearing the wearable structure. Moreover, first and second openings defined by the first bellows and second bellows, respectively, create a passage that fluidically connects the first bellows with the second bellows.

(A4) In some embodiments of A3, the first bellows includes opposing first and second surfaces, whereby: (i) the first surface defines the first opening and is coupled to the second bellows, and (ii) the second surface defines a third opening and is coupled to the wearable structure. Moreover, the fluid from the at least one conduit enters the first bellows at the third opening, and the fluid enters the second bellows, from the first bellows, via the passage.

(A5) In some embodiments of any of A1-A4, the haptic stimulation experienced by the user corresponds to media presented to the user by an artificial-reality system. The computer system mentioned in (A2) may be part of the artificial-reality system.

(A6) In some embodiments of A5, the wearable device further includes a communication interface in communication with the artificial-reality system. The communication interface receives instructions from the artificial-reality system to create the haptic stimulation.

(A7) In some embodiments of A6, the artificial-reality system is a virtual-reality or augmented-reality system, and the media presented to the user by the artificial-reality system includes visual media displayed on one or more displays of the virtual-reality or augmented-reality system.

(A8) In some embodiments of any of A1-A7, the wearable device further includes one or more sensors, integrated with the wearable structure, configured to monitor a state of a respective bladder of the plurality of bladders.

(A9) In some embodiments of A8, the one or more sensors are further configured to provide sensor data to a controller based on the monitored state of the respective bladder. In some embodiments, the controller is part of the wearable device, while in other embodiments, the controller is part of another device (e.g., the computer system 130).

(A10) In some embodiments of A9, the sensor data includes one or more of: (i) measurements of the bladder's expansion, (ii) measurements of the bladder's contraction, and (iii) measurements of the fluid pressure within the bladder.

(A11) In some embodiments of any of A9-A10, when the respective bladder is in an inflated state (i.e., pressurized): (i) the one or more sensors are configured to detect depression of the respective bladder, and (ii) the sensor data provided to the controller indicates the depression of the respective bladder.

(A12) In some embodiments of any of A1-A11, the haptic stimulation experienced by the user is a vibration stimulation or a pressure stimulation.

(A13) In some embodiments of any of A1-A12, two or more of the plurality of bladders are configured to expand simultaneously.

(A14) In some embodiments of any of A1-A13, two or more of the plurality of bladders are configured to expand sequentially.

(A15) In some embodiments of any of A1-A14, the at least one conduit is further configured to transport the fluid from the source to two or more of the plurality of bladders (e.g., to each of the plurality of bladders).

(A16) In some embodiments of any of A1-A14, the wearable device further includes one or more additional conduits. Each additional conduit is configured to transport a fluid from the source to one or more additional bladders of the plurality of bladders. In some embodiments, each bladder is coupled with a distinct conduit of the one or more additional conduits.

(A17) In some embodiments of A16, the source includes a manifold switchably coupled to the at least one conduit and the one or more additional conduits.

(A18) In some embodiments of any of A1-A17, the wearable device further includes the source.

(A19) In some embodiments of any of A1-A18, the plurality of bladders forms a one-dimensional array of bladders along a length of the wearable structure.

(A20) In some embodiments of any of A1-A19, one or more bladders of the plurality of bladders are selectively expanded to improve coupling (e.g., fit, snugness) of the wearable device with the user's body.

(A21) In some embodiments of A20, the wearable device further includes one or more sensors. Moreover, coupling (e.g., fit) of the wearable device with the user's body is evaluated according to sensor data generated by the one or more sensors.

(A22) In another aspect, a system is provided that includes a computer system, a fluid source in communication with the computing device, and a wearable device in communication with the computing device. The system is configured to perform any of A1-A19. An alternative system includes a wearable device, a source in communication with the wearable device, and a computing device in communication with the wearable device. The alternative system is configured to perform any of A1-A21.

(A23) In yet another aspect, one or more wearable devices are provided and the one or more wearable devices include means for performing any one of A1-A21.

(A24) In still another aspect, a non-transitory computer-readable storage medium is provided (e.g., as a memory device, such as external or internal storage, that is in communication with a wearable device). The non-transitory computer-readable storage medium stores executable instructions that, when executed by a wearable device with one or more processors/cores, cause the wearable device to perform any one of A1-A21.

(B1) In accordance with some embodiments, a method is provided that is used to process a user input. The method is performed at a wearable device, attached to a user, that includes (i) an inflatable bladder and (ii) a sensor integrated with the inflatable bladder. The method includes instructing a pressure source to transition the inflatable bladder from an unpressurized state to a pressurized state. The inflatable bladder is associated with a function when transitioned to the pressurized state. The method also includes, while the inflatable bladder is in the pressurized state: (i) detecting, by the sensor, depression of the inflatable bladder, and (ii) generating, by the sensor, sensor data based on the detecting. The method also includes, in response to detecting the depression of the inflatable bladder: (i) determining whether a magnitude (or other characteristics) of the depression satisfies a touch threshold, based on the sensor data, and (ii) in accordance with a determination that the magnitude of the depression satisfies the touch threshold, executing the function.

(B2) In some embodiments of the method of B1, depression of the inflatable bladder, while the inflatable bladder is in the pressurized state, provides tactile feedback to the user (e.g., depression of the inflatable bladder resembles depression of a physical button).

(B3) In some embodiments of the method of any of B1 or B2, the wearable device includes a display, and executing the function includes modifying a user interface displayed on the display.

(B4) In some embodiments of the method of any of B1-B3, while the inflatable bladder is in the pressurized state, the method generates a reminder of an event. Moreover, executing the function includes acknowledging the event. For example, the wearable device may generate an audio reminder, and the executing the function involves silencing the audio reminder.

(B5) In some embodiments of the method of any of B1-B4, the wearable device is in communication with another electronic device, and executing the function includes sending an instruction to the other electronic device according to the function.

(B6) In some embodiments of the method of B5, the other electronic device is an artificial-reality system that includes a head-mounted display, and sending the instruction to the other electronic device causes media displayed on the head-mounted display to change. For example, an alert (or some other message) may be displayed on the head-mounted display, and the user may use the wearable device to acknowledge the alert (e.g., select an affordance displayed in the message).

(B7) In some embodiments of the method of any of B1-B6, the sensor data includes one or more of: (i) measurements of the bladder's expansion, (ii) measurements of the bladder's contraction, and (iii) measurements of the fluid pressure within the bladder.

(B8) In some embodiments of the method of any of B1-B7, instructing the pressure source to transition the inflatable bladder from the unpressurized state to the pressurized state causes the pressure source to add fluid to the inflatable bladder to increase fluid pressure within the bladder.

(B9) In some embodiments of the method of any of B1-B8, the wearable device has the structure of or is configured to perform any of A1-A19.

(B10) In yet another aspect, a wearable device is provided and the wearable device includes means for performing the method described in any one of B1-B9.

(B11) In another aspect, a wearable device includes (i) an inflatable bladder and (ii) a sensor integrated with the inflatable bladder is provided. In some embodiments, the wearable device is in communication with one or more processors and memory storing one or more programs which, when executed by the one or more processors, cause the wearable device to perform the method described in any one of B1-B9.

(B12) In still another aspect, a non-transitory computer-readable storage medium is provided (e.g., as a memory device, such as external or internal storage, that is in communication with a wearable device). The non-transitory computer-readable storage medium stores executable instructions that, when executed by a wearable device with one or more processors/cores, cause the wearable device to perform the method described in any one of B1-B9.

(B13) In still another aspect, a system is provided. The system includes a computer system, a fluid source in communication with the computing device, and a wearable device in communication with the computing device. The system is configured to perform any of B1-B9. An alternative system includes a wearable device, a source in communication with the wearable device, and a computing device in communication with the wearable device. The alternative system is configured to perform any of B1-B9.

The devices, methods, and systems described herein provide benefits including but not limited to: (i) stimulating areas of the body that correspond to media content and sensor data, (ii) the wearable device does not encumber free movement of a user's body, (iii) multiple wearable devices can be used simultaneously, and (iv) the wearable device can be turned into an input device dynamically.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIGS. 7A-7H illustrate a process of fabricating an example wearable device in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first bladder could be termed a second bladder, and, similarly, a second bladder could be termed a first bladder, without departing from the scope of the various described embodiments. The first bladder and the second bladder are both bladders, but they are not the same bladder.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
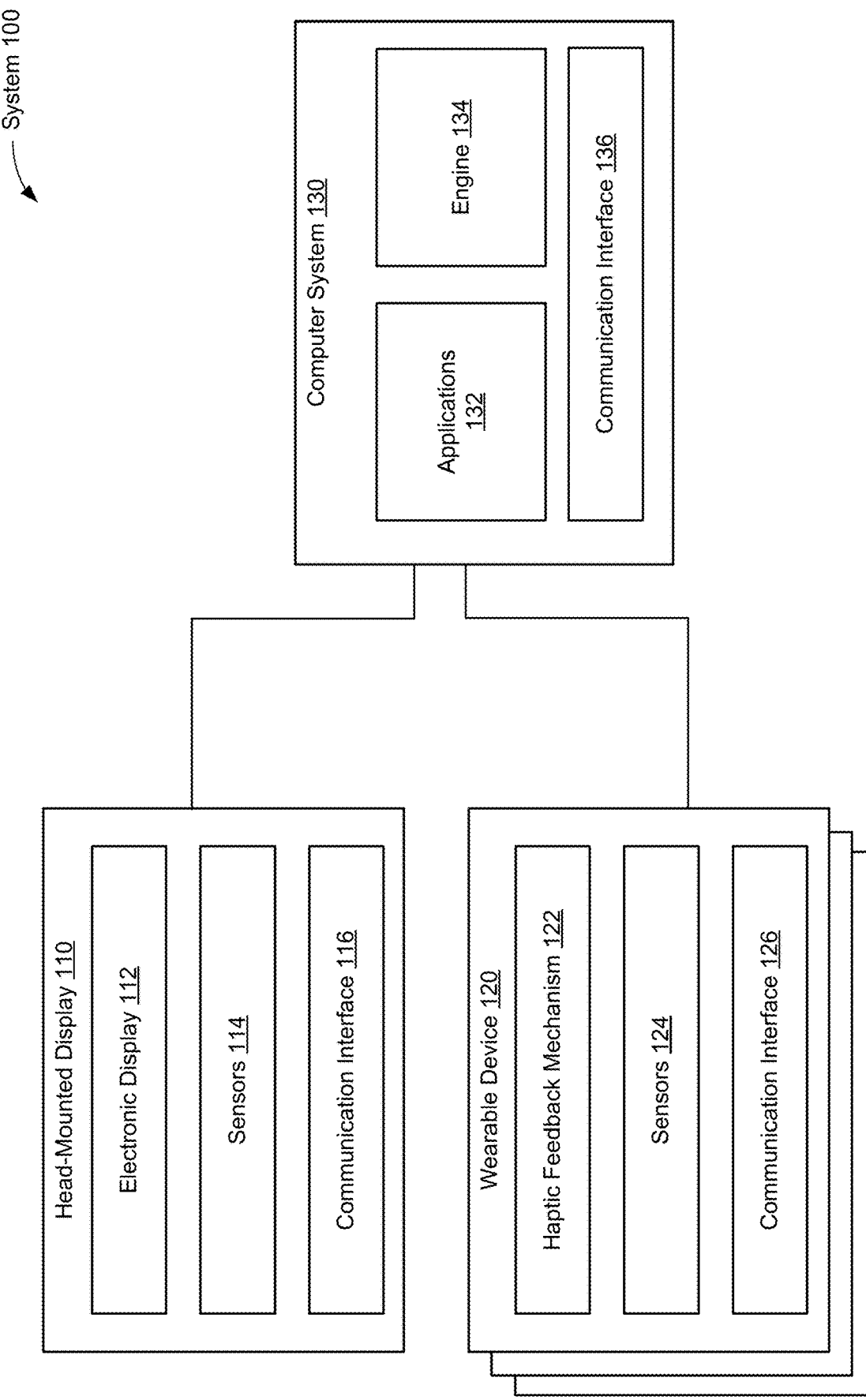
FIG. 1 is a block diagram illustrating an example haptics system, in accordance with various embodiments.

FIG. 1 is a block diagram illustrating a virtual-reality (and/or augmented-reality or mixed-reality) system 100 in accordance with various embodiments. While some example features are illustrated, various other features have not been illustrated for the sake of brevity and so as not to obscure pertinent aspects of the example embodiments disclosed herein. To that end, as a non-limiting example, the system 100 includes one or more wearable devices 120 (sometimes referred to as "haptic devices," "wearable apparatuses," or simply "apparatuses"), which are used in conjunction with a computer system 130 (sometimes referred to a "remote computer system") and a head-mounted display 110. In some embodiments, the system 100 provides the functionality of a virtual-reality device with haptic feedback, an augmented-reality device with haptic feedback, a mixed-reality device with haptic feedback, or a combination thereof.

The head-mounted display 110 presents media to a user. Examples of media presented by the head-mounted display 110 include images, video, audio, or some combination thereof. In some embodiments, audio is presented via an external device (e.g., speakers and/or headphones), which receives audio information from the head-mounted display 110, the computer system 130, or both, and presents audio data based on the audio information.

The head-mounted display 110 includes an electronic display 112, sensors 114, and a communication interface 116. The electronic display 112 displays images to the user in accordance with data received from the computer system 130. In various embodiments, the electronic display 112 comprises a single electronic display 112 or multiple electronic displays 112 (e.g., one display for each eye of a user).

The sensors 114 include one or more hardware devices that detect spatial and motion information about the head-mounted display 110. Spatial and motion information can include information about the position, orientation, velocity, rotation, and acceleration of the head-mounted display 110. For example, the sensors 114 may include one or more inertial measurement units (IMUs) that detect rotation of the user's head while the user is wearing the head-mounted display 110. This rotation information can then be used (e.g., by the engine 134) to adjust the images displayed on the electronic display 112. In some embodiments, each IMU includes one or more gyroscopes, accelerometers, and/or magnetometers to collect the spatial and motion information. In some embodiments, the sensors 114 include one or more cameras positioned on the head-mounted display 110.

The communication interface 116 enables input and output to the computer system 130. In some embodiments, the communication interface 116 is a single communication channel, such as HDMI, USB, VGA, DVI, or DisplayPort. In other embodiments, the communication interface 116 includes several distinct communication channels operating together or independently. In some embodiments, the communication interface 116 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi) and/or any other suitable communication protocol. The wireless and/or wired connections may be used for sending data collected by the sensors 114 from the head-mounted display to the computer system 130.

In such embodiments, the communication interface 116 may also receive audio/visual data to be rendered on the electronic display 112.

The wearable device 120 includes a wearable structure worn by the user (e.g., a glove, a shirt, wristband, pants, etc.). In some embodiments, the wearable device 120 collects information about a portion of the user's body (e.g., the user's hand) that can be used as input for virtual-reality applications 132 executing on the computer system 130. In the illustrated embodiment, the wearable device 120 includes a haptic feedback mechanism 122, sensors 124, and a communication interface 126. The wearable device 120 may include additional components that are not shown in FIG. 1, such as a power source (e.g., an integrated battery, a connection to an external power source, a container containing compressed air, or some combination thereof), one or more processors, and memory.

The haptic feedback mechanism 122 provides haptic feedback (i.e., haptic stimulations) to a portion of the user's body (e.g., hand, wrist, arm, leg, etc.). The haptic feedback may be a vibration stimulation, a pressure stimulation, or some combination thereof. To accomplish this, the haptic feedback mechanism 122 includes a plurality of inflatable bladders 204, each of which is configured to inflate and apply a force to the portion of the user's body. Various embodiments of the haptic feedback mechanism 122 are described with reference to FIGS. 3A-6C. It is also noted that the haptic feedback mechanism 122 may be used to improve coupling (e.g., fit) of the wearable device 120 to the user. For example, instead of (or in addition to) providing a haptic stimulation, one or more bladders 204 of the plurality of inflatable bladders 204 are inflated to varying degrees such that contact is made with the user's body. The contacting bladders prevent the wearable device 120 from moving (e.g., sliding or rotating) when attached to the user's body. This embodiment is particular useful in applications where movement of a wearable device is problematic, such as diving, where it is a significant inconvenience for a diver to continually adjust positioning of a wearable device.

In some embodiments, the sensors 124 include one or more hardware devices that detect spatial and motion information about the wearable device 120. Spatial and motion information can include information about the position, orientation, velocity, rotation, and acceleration of the wearable device 120 or any subdivisions of the wearable device 120, such as fingers, fingertips, knuckles, the palm, or the wrist when the wearable device 120 is worn near the user's hand. The sensors 124 may be IMUs, as discussed above with reference to the sensors 114. The sensors 124 may include one or more hardware devices that monitor a state of a respective bladder 204 of the haptic feedback mechanism 122. Sensors for monitoring a bladder's state are discussed in more detail below with reference to FIGS. 5A-5C.

The communication interface 126 enables input and output to the computer system 130. In some embodiments, the communication interface 126 is a single communication channel, such as USB. In other embodiments, the communication interface 126 includes several distinct communication channels operating together or independently. For example, the communication interface 126 may include separate communication channels for receiving control signals for the haptic feedback mechanism 122 and sending data from the sensors 124 to the computer system 130. The one or more communication channels of the communication interface 126 can be implemented as wired or wireless connections. In some embodiments, the communication interface 126 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

The computer system 130 is a computing device that executes virtual-reality applications and/or augmented-reality applications to process input data from the sensors 114 on the head-mounted display 110 and the sensors 124 on the wearable device 120. The computer system 130 provides output data for (i) the electronic display 112 on the head-mounted display 110 and (ii) the haptic feedback mechanism 122 on the wearable device 120.

The computer system includes a communication interface 136 that enables input and output to other devices in the system 100. The communication interface 136 is similar to the communication interface 116 and the communication interface 126.

In some embodiments, the computer system 130 sends instructions (e.g., the output data) to the wearable device 120. In response to receiving the instructions, the wearable device 120 creates one or more haptic stimulations (e.g., activates one or more of the bladders 204). Alternatively, in some embodiments, the computer system 130 sends instructions to an external device, such as a fluid (pressure) source, and in response to receiving the instructions, the external device creates one or more haptic stimulations (e.g., the output data bypasses the wearable device 120). Alternatively, in some embodiments, the computer system 130 sends instructions to the wearable device 120, which in turn sends the instructions to the external device. The external device then creates one or more haptic stimulations by adjusting fluid pressure in one or more of the bladders 204. Although not shown, in the embodiments that include a distinct external device, the external device may be connected to the head-mounted display 110, the wearable device 120, and/or the computer system 130 via a wired or wireless connection. The external device may be a pneumatic device, a hydraulic device, some combination thereof, or any other device capable of adjusting pressure.

The computer system 130 can be implemented as any kind of computing device, such as an integrated system-on-a-chip, a microcontroller, a desktop or laptop computer, a server computer, a tablet, a smart phone or other mobile device. Thus, the computer system 130 includes components common to typical computing devices, such as a processor, random access memory, a storage device, a network interface, an I/O interface, and the like. The processor may be or include one or more microprocessors or application specific integrated circuits (ASICs). The memory may be or include RAM, ROM, DRAM, SRAM and MRAM, and may include firmware, such as static data or fixed instructions, BIOS, system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, CD, DVD, or other reasonably high capacity addressable or serial storage medium. Multiple storage devices may be provided or available to the computing device. Some of these storage devices may be external to the computing device, such as network storage or cloud-based storage. The network interface includes an interface to a network and can be implemented as either wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 1, the computer system 130 further includes virtual-reality (and/or augmented-reality) applications 132 and a virtual-reality (and/or augmented-reality) engine 134. In some embodiments, the virtual-reality applications 132 and the virtual-reality engine 134 are implemented as software modules that are stored on the storage device and executed by the processor. Some embodiments of the computer system 130 include additional or different components than those described in conjunction with FIG. 1. Similarly, the functions further described below may be distributed among components of the computer system 130 in a different manner than is described here.

Each virtual-reality application 132 is a group of instructions that, when executed by a processor, generates virtual-reality content for presentation to the user. A virtual-reality application 132 may generate virtual-reality content in response to inputs received from the user via movement of the head-mounted display 110 or the wearable device 120. Examples of virtual-reality applications 132 include gaming applications, conferencing applications, and video playback applications.

The virtual-reality engine 134 is a software module that allows virtual-reality applications 132 to operate in conjunction with the head-mounted display 110 and the wearable device 120. In some embodiments, the virtual-reality engine 134 receives information from the sensors 114 on the head-mounted display 110 and provides the information to a virtual-reality application 132. Based on the received information, the virtual-reality engine 134 determines media content to provide to the head-mounted display 110 for presentation to the user via the electronic display 112 and/or a type of haptic feedback to be created by the haptic feedback mechanism 122 of the wearable device 120. For example, if the virtual-reality engine 134 receives information from the sensors 114 on the head-mounted display 110 indicating that the user has looked to the left, the virtual-reality engine 134 generates content for the head-mounted display 110 that mirrors the user's movement in a virtual environment.

Similarly, in some embodiments, the virtual-reality engine 134 receives information from the sensors 124 on the wearable device 120 and provides the information to a virtual-reality application 132. The application 132 can use the information to perform an action within the virtual (or augmented) world of the application 132. For example, if the virtual-reality engine 134 receives information from the sensors 124 that the user has closed his fingers around a position corresponding to a coffee mug in the virtual environment and raised his hand, a simulated hand in the virtual-reality application 132 picks up the virtual coffee mug and lifts it to a corresponding height. As noted above, the information received by the virtual-reality engine 134 can also include information from the head-mounted display 110. For example, cameras on the head-mounted display 110 may capture movements of the wearable device 120, and the application 132 can use this additional information to perform the action within the virtual world of the application 132.

In some embodiments, the virtual-reality engine 134 provides feedback to the user that the action was performed. The provided feedback may be visual via the electronic display 112 in the head-mounted display 110 (e.g., displaying the simulated hand as it picks up and lifts the virtual coffee mug) and/or haptic feedback via the haptic feedback mechanism 122 in the wearable device 120. For example, the haptic feedback may vibrate in a certain way to simulate the sensation of firing a firearm in a virtual-reality video game. To do this, the wearable device 120 changes (either directly or indirectly) fluid pressure of one or more of bladders of the haptic feedback mechanism 122. When inflated by a threshold amount (and/or inflated at a threshold frequency, such as at least 5 Hz), a respective bladder of the haptic feedback mechanism 122 presses against the user's body, resulting in the haptic feedback. The wearable device 120 is discussed in further detail below with reference to FIGS. 3A to 6C.

To provide some additional context, the bladders described herein are configured to transition between a first pressurized state and a second pressurized state to provide haptic feedback to the user. Due to the ever-changing nature of virtual and augmented reality, the bladders may be required to transition between the two states hundreds, or perhaps thousands of times, during a single use. Thus, the bladders described herein are durable and designed to quickly transition from state to state (e.g., within 10 milliseconds). In the first pressurized state, a respective bladder is unpressurized (or a fluid pressure inside the respective bladder is below a threshold pressure) and does not provide haptic feedback to a portion of the wearer's body. However, once in the second pressurized state (e.g., the fluid pressure inside the respective bladder reaches the threshold pressure), the respective bladder is configured to expand and press against the portion of the wearer's body, and in some cases, resist movement of the portion of the wearer's body.

As mentioned above, the haptic stimulations created by the wearable device 120 can correspond to data displayed by the head-mounted display 110. The data (e.g., media content) displayed by the head-mounted display 110 (e.g., via the electronic display 112) may depict the wearer walking in a virtual world (or augmented version of the real world). The wearable device 120 may create one or more haptic stimulations to provide directions to the user. For example, if the wearer is to turn left in the virtual world down a street, then the wearable device 120, if positioned on the wearer's left wrist, may vibrate in a certain manner to alert the wearer of the needed left turn. In another example, the data (i.e., media content) displayed by the head-mounted display 110 (e.g., via the electronic display 112) depicts the wearer with a bow and arrow. The wearable device 120 may create one or more haptic stimulations to mimic a feeling of the arrow being released from the bow. For example, if the wearer is holding the virtual bow in his left hand, then the haptic stimulation may be created on the left wrist to mimic the force of the arrow being released from the bow. In view of the examples above, the wearable device 120 is used to further immerse the user in virtual and/or augmented reality experience such that the user not only sees (at least in some instances) the data on the head-mounted display 110, but the user may also "feel" certain aspects of the displayed data. Moreover, the wearable device 120 is designed to not restrict movement of the user's appendages, until desired.

Figure 2A:
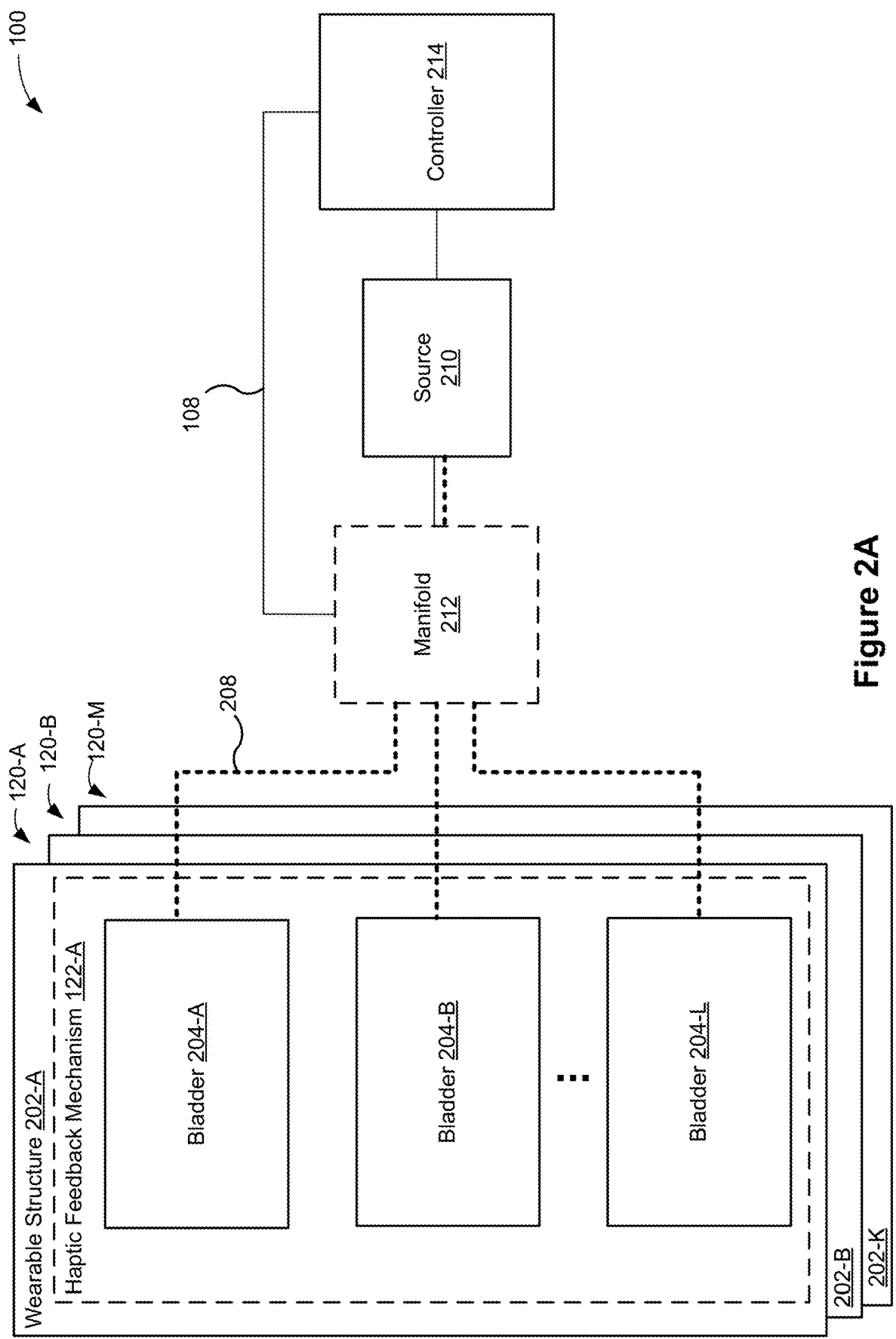
FIG. 2A is a schematic of an example haptics system in accordance with some embodiments.

FIG. 2A is a schematic of the system 100 in accordance with some embodiments. The components in FIG. 2A are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

As a non-limiting example, the system 100 includes a plurality of wearable devices 120-A, 120-B, . . . 120-M, each of which includes a wearable structure 202 and a haptic feedback mechanism 122. Each haptic feedback mechanism 122 includes a plurality of bladders 204, and as explained above, the bladders 204 are configured to provide haptic stimulations to a wearer of the wearable device 120. The wearable structure 202 of each wearable device 120 can be various articles of clothing (e.g., gloves, socks, shirts, or pants) or other wearable structure (e.g., watch band), and thus, the user may wear multiple wearable devices 120 that provide haptic stimulations to different parts of the body. In some embodiments, the wearable structure 202 is made from an elastic material, thereby allowing the wearable device 120 to fit various users. In some embodiments, a distance between adjacent bladders 204 increases from a base distance when the elastic material stretches to accommodate (e.g., a wrist) of a particular user.

Each bladder 204 is integrated with (e.g., embedded in or coupled to) the wearable structure 202. The bladder 204 is a sealed, inflatable pocket made from a durable, puncture resistance material, such as thermoplastic polyurethane (TPU) or the like. Each bladder 204 is configured to expand or contract according to fluid pressure within each bladder. Fluid as used herein can be various media, including air, an inert gas, or a liquid. In some embodiments, each bladder 204 delivers (e.g., imparts) a haptic stimulation to the user wearing the wearable structure 202 when the bladder expands a threshold amount (i.e., a fluid pressure within the bladder reaches a threshold pressure). The threshold amount of expansion can range from 1 mm to 15 mm. Each bladder 204 can also deliver a haptic stimulation to the user wearing the wearable structure 202 when the bladder expands and contracts at a threshold frequency (e.g., greater than approximately 5 Hz). An example method for fabricating a plurality of bladders 204 on a wearable structure 202 is provided below in FIGS. 7A-7H. In one example, the wearable structure 202 with a plurality of bladders 204 (e.g., eight bladders) attached thereto weighs approximately 15 grams and has a width of 20 mm.

The system 100 also includes a controller 214 and a fluid source 210 (e.g., a pneumatic device). In some embodiments, the controller 214 is part of the computer system 130 (e.g., the processor of the computer system 130). Alternatively, in some embodiments, the controller 214 is part of the wearable device 120. The controller 214 is configured to control operation of the source 210, and in turn the operation (at least partially) of the wearable devices 120. For example, the controller 214 sends one or more signals to the source 210 to activate the source 210 (e.g., turn it on and off). The one or more signals may specify a desired pressure (e.g., pounds-per-square inch) to be output by the source 210. Additionally, the one or more signals may specify a desired frequency for outputting the desired pressure (e.g., 0.5 Hz to 50 Hz). The one or more signals may further specify one or more of: (i) one or more target bladders 204 to be inflated and (ii) a pattern of inflation for the one or more target bladders 204. The pattern of inflation may define a direction for inflating the one or more target bladders 204 (e.g., left to right, right to left, edge to center, center to edge, or circular) and inflation crossover between adjacent bladders of the one or more target bladders 204 (e.g., a bladder is inflated for X-amount of time while an adjacent bladder is inflated).

Generation of the one or more signals, and in turn the pressure output by the source 210, may be based on information collected by the HMD sensors 114 and/or the wearable device sensors 124. For example, the one or more signals may cause the source 210 to increase the pressure inside one or more bladders 204 of a first wearable device 120 at a first time, based on the information collected by the sensors 114 and/or the sensors 124 (e.g., the user makes contact with the virtual coffee mug or fires a virtual firearm). Then, the controller 214 may send one or more additional signals to the source 210 that cause the source 210 to further increase the pressure inside the one or more bladders 204 of the first wearable device 120 at a second time after the first time, based on additional information collected by the sensors 114 and/or the sensors 124 (e.g., the user grasps and lifts the virtual coffee mug). Further, the one or more signals may cause the source 210 to inflate one or more bladders 204 in a first wearable device 120-A, while one or more bladders 204 in a second wearable device 120-B remain unchanged (or are inflated to some other pressure). Additionally, the one or more signals may cause the source 210 to inflate one or more bladders 204 in the first wearable device 120-A to a first pressure and inflate one or more other bladders 204 in the first wearable device 120-A to a second pressure different from the first pressure. Depending on the number of wearable devices 120 serviced by the source 210, and the number of bladders therein, many different inflation configurations can be achieved through the one or more signals and the examples above are not meant to be limiting.

In some embodiments, the system 100 includes a manifold 212 between the source 210 and the wearable devices 120. In some embodiments, the manifold 212 includes one or more valves (not shown) that fluidically (e.g., pneumatically) couple each of the haptic feedback mechanisms 122 with the source 210 via tubing 208 (also referred to herein as "conduits"). In some embodiments, the tubing is ethylene propylene diene monomer (EPDM) rubber tubing with 1/32" inner diameter (various other tubing can also be used). In some embodiments, the manifold 212 is in communication with the controller 214, and the controller 214 controls the one or more valves of the manifold 212 (e.g., the controller generates one or more control signals). The manifold 212 is configured to switchably couple the source 210 with the bladders 204 of the same or different wearable devices 120 based on one or more control signals from the controller 214. In some embodiments, instead of the manifold 212 being used to fluidically couple the source 210 with the haptic feedback mechanisms 122, the system 100 includes multiple sources 210, where each is fluidically coupled directly with a single (or multiple) bladder(s) 204. In some embodiments, the source 210 and the optional manifold 212 are configured as part of one or more of the wearable devices 120 (not illustrated) while, in other embodiments, the source 210 and the optional manifold 212 are configured as external to the wearable device 120. A single source 210 may be shared by multiple wearable devices 120.

In some embodiments, the source 210 is a pneumatic device, hydraulic device, a pneudraulic device, or some other device capable of adding and removing a medium from the one or more bladders 204. In other words, the discussion herein is not limited to pneumatic devices, but for ease of discussion, pneumatic devices are used as the primary example in the discussion below.

The devices shown in FIG. 2A may be coupled via a wired connection (e.g., via busing 108). Alternatively, one or more of the devices shown in FIG. 2A may be wirelessly connected (e.g., via short-range communication signals).

Figure 2B:
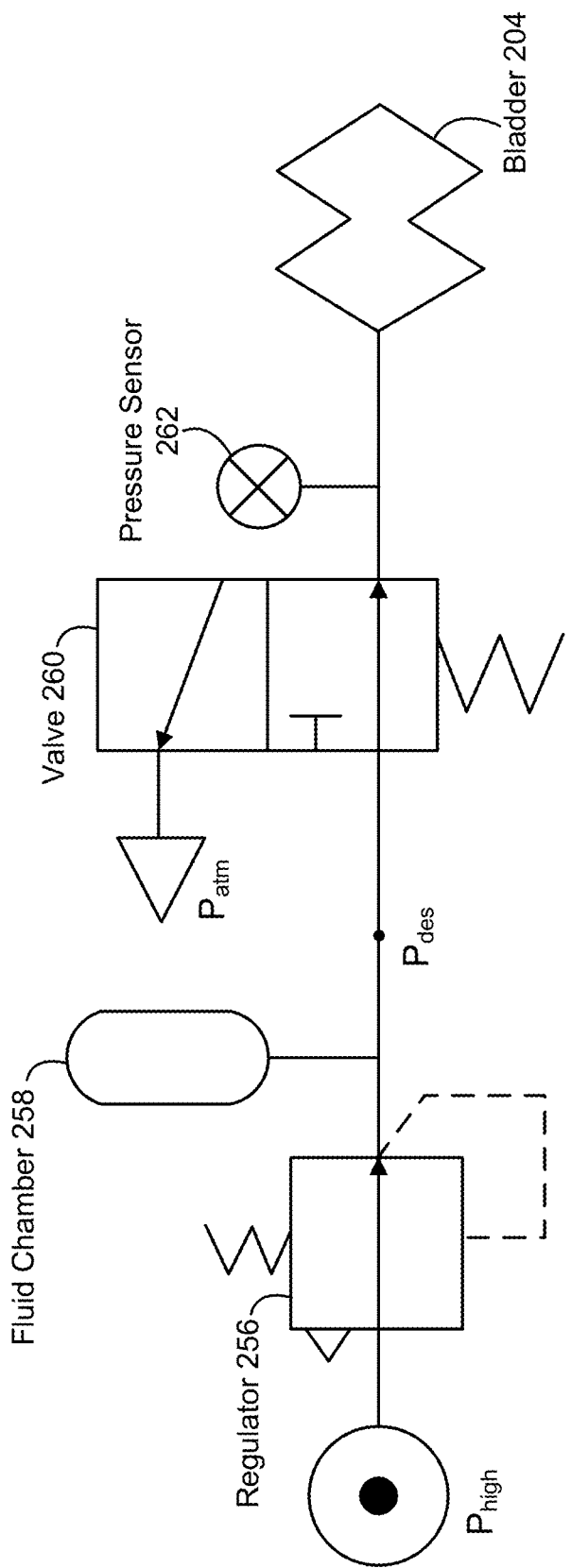
FIG. 2B is another schematic of an example haptics system in accordance with some embodiments.

FIG. 2B is another schematic of the system 100 in accordance with some embodiments. While some example features are illustrated in FIG. 2B, various other features have not been illustrated for the sake of brevity and so as not to obscure pertinent aspects of the example implementations disclosed herein.

FIG. 2B details components used to control fluid transfer from the source 210 to a respective bladder 204. The components include a regulator 256 (e.g., a Kelly Pneumatics Inc. high flow pressure regulator), a fluid chamber 258, a valve 260, and a pressure sensor 262 (e.g., Cynergy3 IPSU-GP100-6 pressure sensors). Accordingly, to control actuation of the bladder 204, the regulator 256 is set to the desired pressure ($P_{des}$), and the output of the regulator 256 is fed to the valve 260. In this example, the valve 260 is connected to a single bladder 204, allowing easy alternation between $P_{des}$ and $P_{atm}$ (note, in some embodiments, the valve 260 is connected to multiple bladders 204). The arrangement shown in FIG. 2B can produce step responses on the order of 10 ms using the valve 260, and analog pressure control on the order of seconds using the regulator 256. The fluid chamber 258, while optional, eliminates a gradual pressure rise that results from the regulator 256 compensating for fluid flow to the bladder 204. To do this, the fluid chamber 258 adds fluid between the regulator 256 and the valve 260 when the valve 260 is opened. In some embodiments, sensor measurements by the sensor 262 are recorded at greater than 1000 Hz, including the pressure between the valve and the bellow and the force/torque exerted by the bellow.

Figure 3A:
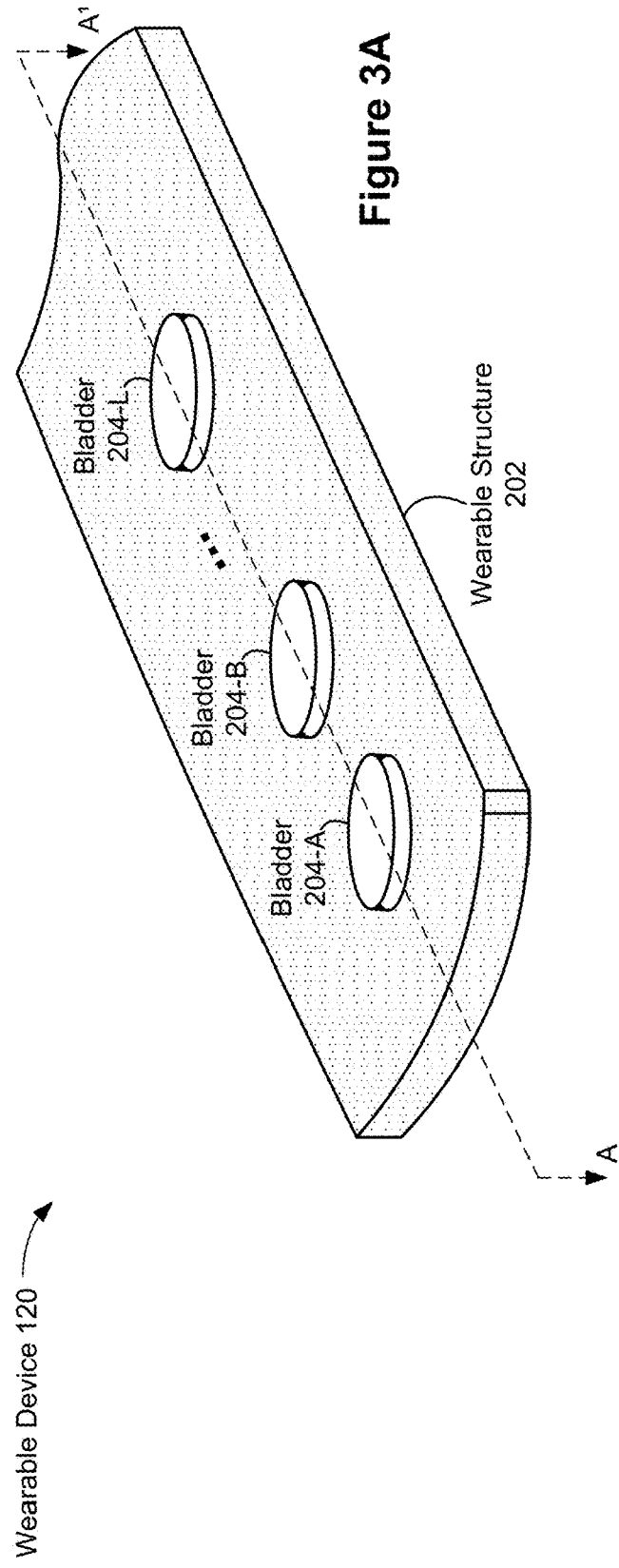
FIGS. 3A and 3B show various views of a simplified wearable device in accordance with some embodiments.
Figure 3B:
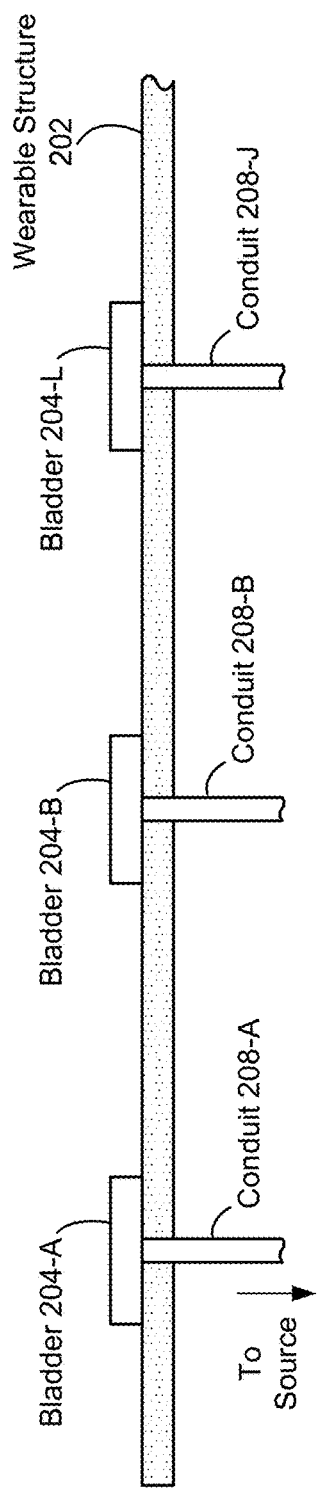

FIGS. 3A and 3B show various views of a representative wearable device 120 in accordance with some embodiments. In particular, FIG. 3A is an isometric view of the wearable device 120 and FIG. 3B shows a cross-sectional view of the wearable device 120 (taken along line A-A$^1$ in FIG. 3A). As shown, the wearable device 120 includes (i) a wearable structure 202 and (ii) multiple bladders 204-A, 204-B, . . . 204-L integrated with the wearable structure 202. Each bladder 204 is configured expand and contract according to fluid pressure within each bladder 204. Furthermore, each bladder 204 delivers (e.g., imparts) a haptic stimulation to the user wearing the wearable structure 202 when the bladder 204 expands a threshold amount (and/or vibrates at a threshold frequency). A bladder 204 is referred to below as being "activated" when the bladder 204 expands the threshold amount (and/or vibrates at a threshold frequency). Each bladder 204 can withstand over 100 kPa of pressure, extend over 10 mm, and exert over 10 N of force at zero displacement.

Each bladder 204 is capable of creating multiple types of haptic stimulations (also referred to as "tactile feedback," "haptic feedback" or "haptic cues"), including a pressure stimulation and a vibration stimulation. The pressure stimulation is created (e.g., generated) when the bladder 204 expands the threshold amount, and in doing so, presses against the user's body. In some embodiments, each bladder 204 is capable of creating pressure stimulations of different magnitudes. For example, a first pressure stimulation (least intense) is created when the bladder 204 expands a first threshold amount (e.g., contact is made with the user's body, but minimal pressure is applied to the user), a second pressure stimulation is created when the bladder 204 expands a second threshold amount greater than the first threshold amount (e.g., contact is made with the user's body and significant pressure is applied to the user), and so on. In some embodiments, the magnitude of the pressure stimulation corresponds to media presented to the user by the head-mounted display 110.

The vibration stimulation is created by repeatedly changing the fluid pressure within the bladder 204, where the bladder 204 expands a threshold amount during each cycle. In some embodiments, each bladder 204 is capable of creating vibration stimulations of different magnitudes and frequency. For example, a first vibration stimulation (least intense) is created when the bladder 204 expands a first threshold amount during each cycle (e.g., contact may or may not be made with the user's body, but the user can nevertheless feel the vibration), a second vibration stimulation is created when the bladder 204 expands a second threshold amount greater than the first threshold amount during each cycle (e.g., contact is made), and so on. Additionally, the first vibration stimulation may have a first frequency and the second vibration stimulation may have a second frequency, where the second frequency is greater that the first frequency (or vice versa). In some embodiments, the magnitude and frequency of the vibration stimulation corresponds to media presented to the user by the head-mounted display 110.

Figure 12:
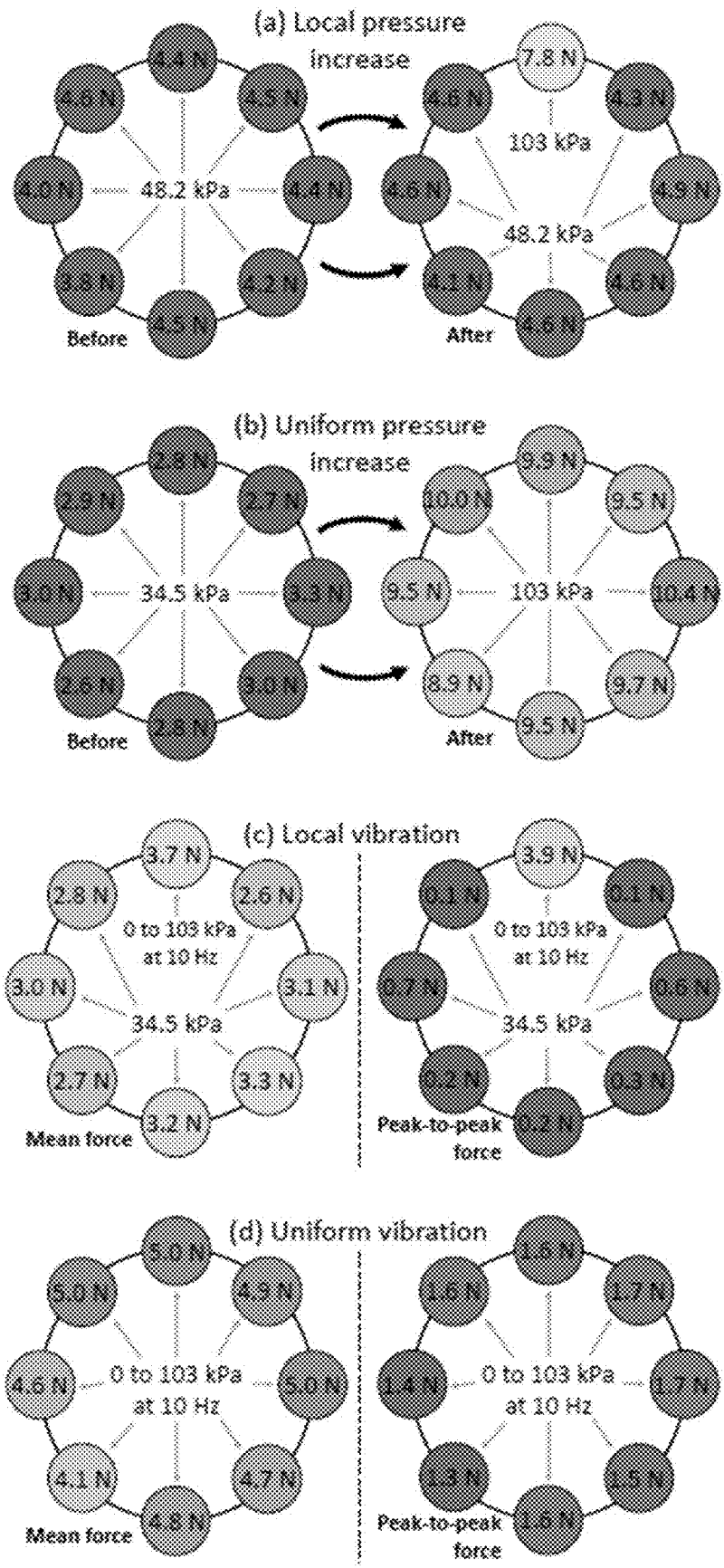
FIG. 12 illustrates recorded normal force under bladders during different haptic cues applied to a user's wrist.

Furthermore, when two or more bladders are activated simultaneously (or sequentially), the wearable device 120 is capable of creating (e.g., generating) various other haptic simulations, including a touch stimulation, a swipe stimulation, a pull stimulation, a push stimulation, a rotation stimulation, a heat stimulation, a pulsating stimulation, a local vibration stimulation, a local pressure stimulation, a uniform squeezing stimulation, and a uniform vibration stimulation. Additionally, in some embodiments, each of the bladders 204 of a respective wearable device 120 is activated simultaneously. FIG. 12 illustrates recorded normal force under each bladder 204 during different haptic cues applied to a user's wrist. As shown in FIG. 12, the different haptic cues include (a) pressure increase in one bladder, (b) pressure increase in all bladders, (c) vibration in one bladder, and (d) vibration in all bladders. The measured normal forces are shown in the small circles used to represent bladders, and the arrows indicate commanded pressure.

In some embodiments, each bladder 204 defines an opening that is sized to accommodate a valve (this valve is different from the manifold valves discussed above). The valve is fitted into the opening so that the bladder 204 remains sealed (i.e., airtight). In some embodiments, an adhesive may be deposited around a perimeter of the opening defined by the bladder 204 to ensure that the bladder 204 remains sealed (e.g., to ensure that the valve remains fixed in the opening). Alternatively, or in addition, an adhesive may be deposited around the valve to ensure that the bladder 204 remains sealed (e.g., to ensure that the valve remains fixed in the opening). The valve may be made from metal (e.g., stainless steel).

The valve may be fixed to an end of a conduit 208 (e.g., tubing). Each conduit 208 is configured to transport a fluid from the source 210 to one or more bladders (or each) of the plurality of bladders. In some embodiments, the number of conduits in less than the number of bladders 204 (e.g., each conduit 208 is configured to transport fluid from the source to two or more bladders 204). In such embodiments, one or more channels may be used to fluidically couple adjacent (or non-adjacent) bladders to each other. In this way, fewer conduits are needed to service each of the bladders 204. In other embodiments, the number of conduits is equal to the number of bladders 204 (e.g., there is a one-to-one relationship between conduits 208 and bladders 204). In this way, each bladder 204 is serviced individually by a respective conduit 208. In some embodiments, the wearable device 120 includes a single conduit 208 that is configured to transport fluid from the source to one or more of the bladders 204 included in the wearable device 120. In other embodiments, the wearable device 120 includes multiple conduits 208, each of which is configured to transport fluid from the source to one or more of the bladders 204 included in the wearable device 120.

The orientation of the conduits 208 shown in FIG. 3B is merely one example orientation. In other embodiments, the conduits 208 are perpendicular to the orientation shown in FIG. 3B. For example, with reference to FIG. 6A, the conduits 208 are positioned horizontally, in contrast to their vertical orientation shown in FIG. 3B. It is also noted that the bladders 204 may be embedded, at least partially, within the wearable structure 202. The circular (e.g., disk) shape of the bladders 204-A, 204-B, . . . 204-N shown in FIG. 3A is merely one example bladder shape, and the bladders 204 may have different shapes, such as rectangular, triangular, or elliptical. Moreover, one or more first bladders 204 may have a first shape and one or more second bladders may a second shape different from the first shape. The different shapes of the bladders may be used to suit a particular application (e.g., a structure of a particular wearable device may require rectangular bladders), and also may be used to impart different haptic stimulations to the user (e.g., a rectangular-shaped bladder may be more suitable to impart a haptic stimulation in first circumstances and a circular-shaped bladder may be more suitable to impart a haptic stimulation in second circumstances). In those embodiments with non-circular shaped bladders, corners of the bladders may be rounded to make the bladders more durable and robust.

Figure 6A:
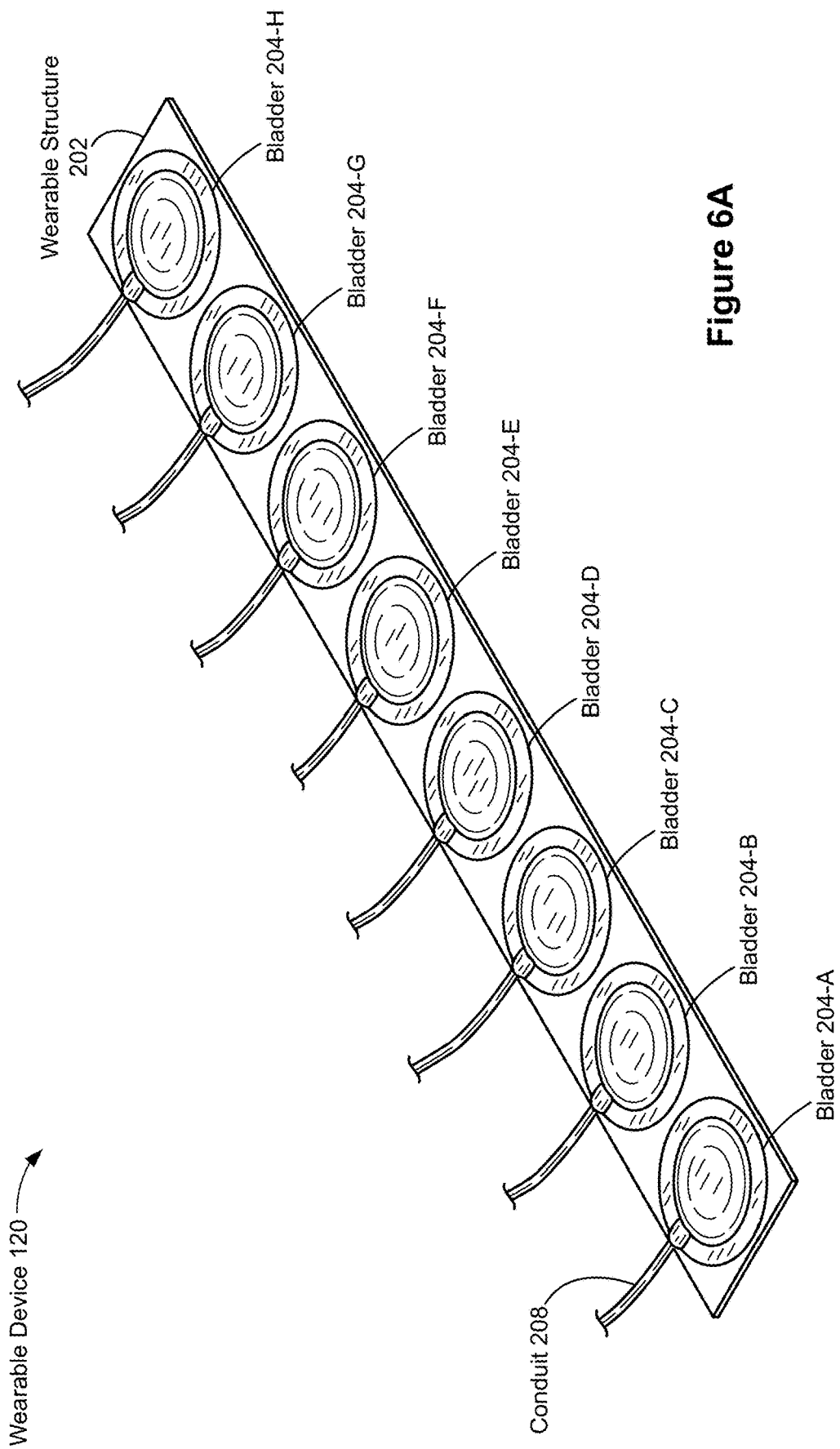
FIGS. 6A and 6B show examples of a representative wearable device in different states in accordance with some embodiments.
Figure 6B:
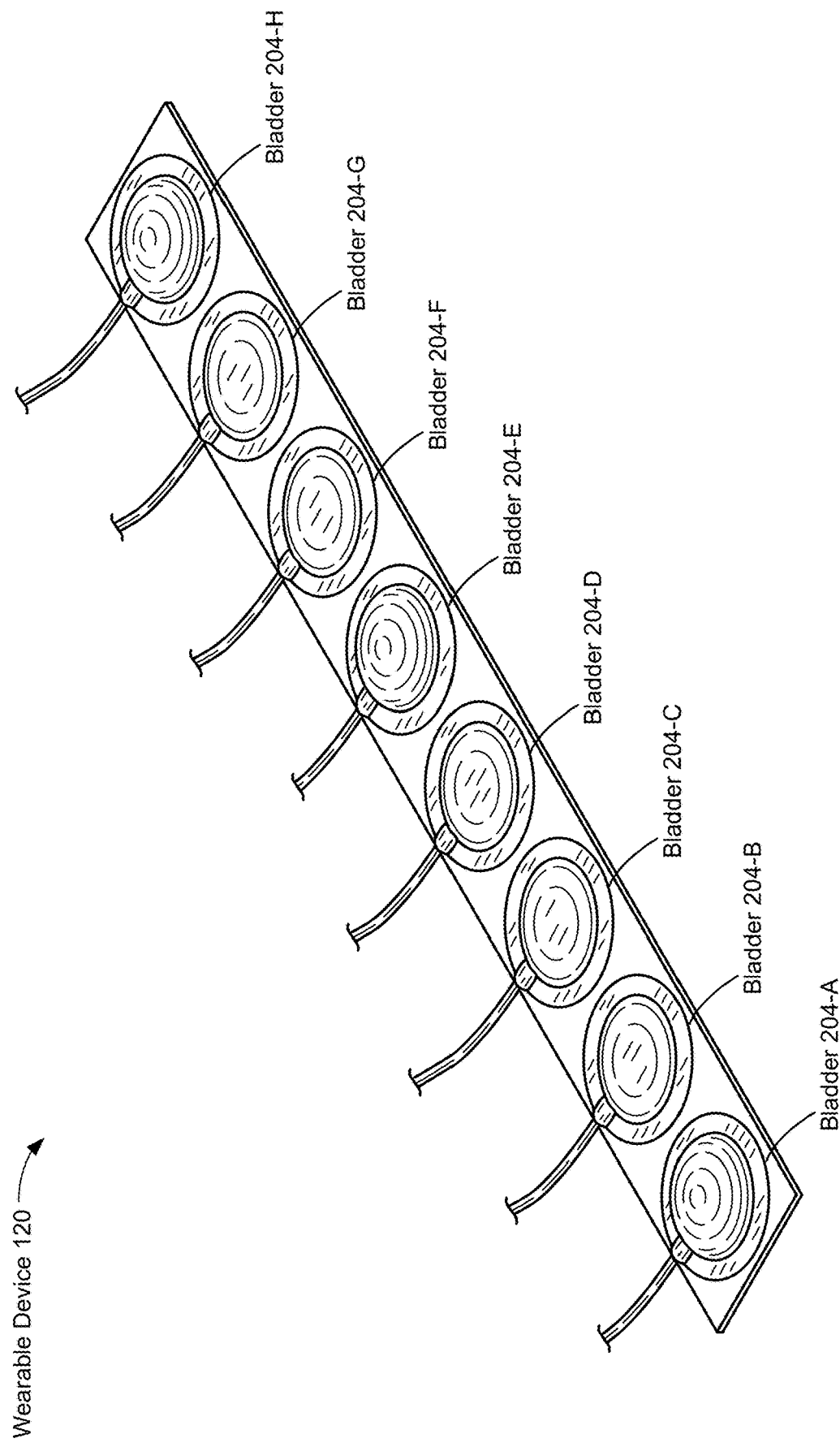

In FIGS. 3A and 3B, the multiple bladders 204-A, 204-B, . . . 204-L form a one-dimensional array of bladders along a length of the wearable structure. Additionally, when the wearable device 120 is attached to the user, the one-dimensional array of bladders forms a circular array of bladders (e.g., bladders in the array are radially spaced, and in some instances, equidistant from each other). In addition, in some embodiments, the multiple bladders 204-A, 204-B, . . . 204-L form a multi-dimensional array of bladders. For example, the multiple bladders 204-A, 204-B, . . . 204-L may include at least one row of bladders (e.g., as shown in FIG. 3A) (i.e., a first dimension) and at least one column of bladders (i.e., a second dimension), where the at least one column of bladders includes at least two bladders. The column of bladders can be used to increase the magnitude (and contact area) of a haptic stimulation at a specific location. In some embodiments, the wearable device 120 includes an equal number of rows and columns of bladders 204 (e.g., one-to-one, two-to-two, and so on). Additional examples of the wearable device 120 are illustrated in FIGS. 6A and 6B.

Figure 4:
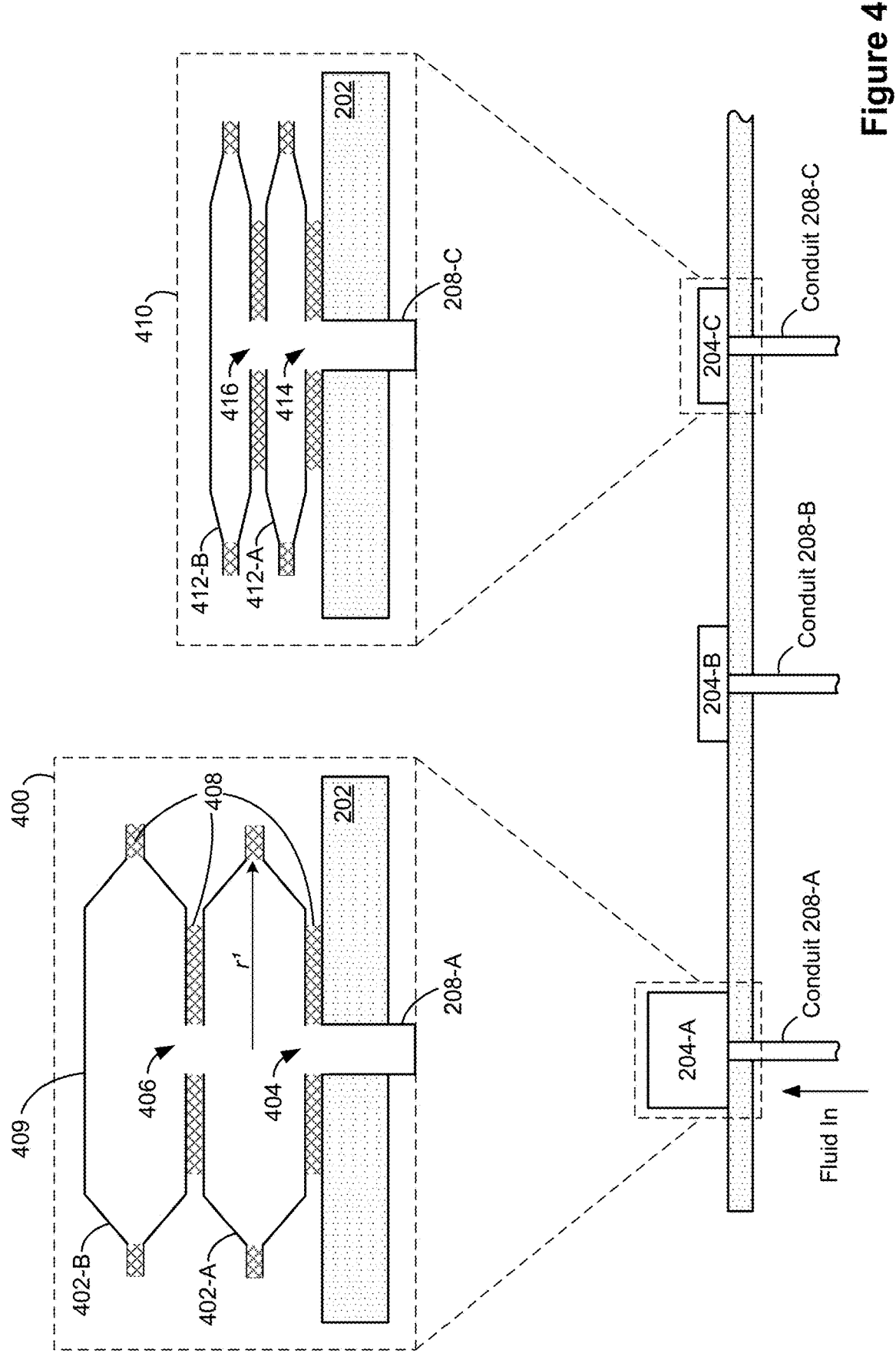
FIG. 4 shows a cross-sectional view of the simplified wearable device (taken along line A-A$^1$ in FIG. 3A).

FIG. 4 shows another cross-sectional view of the wearable device 120 (taken along line A-A$^1$ in FIG. 3A). As shown, the wearable device 120 includes at least three bladders 204-A, 204-B, and 204-C, where the first bladder 204-A is inflated (e.g., is in a pressurized/inflated state) while the second and third bladders 204-B and 204-C are not inflated (e.g., are in an unpressurized state). Alternatively, the second and third bladders 204-B and 204-C may be partially inflated (e.g., fluid pressure is below a threshold, and therefore the second and third bladders 204-B and 204-C are not in the pressurized/inflated state). The magnified views 400 and 410 illustrate the structure of the first bladder 204-A and the third bladder 204-C, which has the same structure. However, the magnified views 400 and 410 illustrate how the structure of the first bladder 204-A changes according to fluid pressure within the bladder 204-A (e.g., a fluid is fed into the first bladder 204-A and not the third bladder 204-C). It is noted that the structure of the third bladder 204-C may be flatter in practice, and the slightly raised structure shown in magnified view 410 is used primarily for illustrative purposes.

The magnified view 400 shows the structure of the first bladder 204-A. As shown, the first bladder 204-A includes (i) a first bellows 402-A and (ii) a second bellows 402-B positioned on top of the first bellows 402-A. A surface 409 of the second bellows 402-B is the surface of the bladder 204-A that contacts the user wearing the wearable structure 202. The first bellows 402-A is coupled to the wearable structure 202 via a chemical fastener 408 (e.g., an adhesive) while the second bellows 402-B is coupled to the first bellows 402-A via another chemical fastener 408. Moreover, the first and second bellows define respective openings that collectively form a passage 406 that fluidically connects the first bellows 402-A with the second bellows 402-B. In addition, the first bellows 402-A defines another opening 404 sized to accommodate an end (e.g., a valve) of the conduit 208-A. In such an arrangement, fluid from the conduit 208-A enters the first bellows 402-A at the opening 404, and subsequently, the fluid enters the second bellows 402-B, from the first bellows 402-A, via the passage 406. The stacked arrangement of the first and second bellows 402 facilitates a substantial expansion of the bladder 204-A in a preferred direction (e.g., in the vertical direction of FIG. 4), which cannot be achieved with a single bellows. With this enhanced expansion of the bladder 204-A, the structure imparts a significant force onto the user wearing the wearable device 120, while also minimizing the noticeability of the wearable device 120 (e.g., the wearable device 120 is lightweight and compact).

In some embodiments, a radius of the passage 406 is approximately 1 mm, and a radius of the opening 404 is also approximately 1 mm. In such embodiments, a radius (r') of the bellow 402-A is approximately 8 mm (the other bellows may have the same radius, or a different radius). Various other radii are possible, and in some embodiments, the radii of the passage 406 and the opening 404 have a proportional relationship with the radii of the bellows.

While not shown, the first bladder 204-A may include a third bellows positioned on top of the second bellows 402-B. In such embodiments, the second bellows 402-B is modified to have the same structure as the first bellows 402-A, and a structure of the third bellows matches the structure of the second bellows 402-B shown in FIG. 4. A third bellows (or even a fourth bellows) can be used when the wearable device 120 is worn on a portion of the user's body where the wearable device 120 tends to separate away from the user's skin. In other words, it is difficult to maintain direct contact between the bladders and the user skin. The third bellows is therefore needed to create greater expansion in the preferred direction, so that a force can be imparted onto the user.

In some embodiments, the first bellows 402-A is identical to the second bellows 402-B (aside from the second bellows 402-B not having multiple openings). For example, in the illustrated embodiment, the diameter (i.e., width) of each bellows is approximately the same. Additionally, when inflated/pressurized, each bellows expands vertically by approximately the same amount. In other embodiments, however, the first bellows 402-A differs from the second bellows 402-B in some way. For example, a diameter (i.e., width) of each bellows may differ. To illustrate, the second bellows 402-B may be narrower than the first bellows 402-A (or vice versa), such that the first bellows 402-A and the second bellows 402-B form a triangular shape (e.g., substantially frustoconical). In another example, the first bellows 402-A may be made from a first material while the second bellows 402-B may be made from a second material that differs from the first material. The use of different materials can influence the shape of the bladder 204 in the inflated state. For example, material properties (e.g., elastic versus inelastic or less elastic) of the first and second bellows can contribute to the shape taken by the bladder 204. Additionally, material thickness can contribute to the shape taken by the bladder 204.

As noted above, the third bladder 204-C has the same structure as the first bladder 204-A. For example, first and second bellows of the third bladder 204-C define respective openings that collectively form a passage 416 that fluidically connects the first bellows 412-A with the second bellows 412-B. In addition, the first bellows 412-A defines another opening 414 sized to accommodate an end of the conduit 208-C. For the sake of brevity, the remaining description of the third bladder 204-C's components is not repeated here.

Figure 5A:
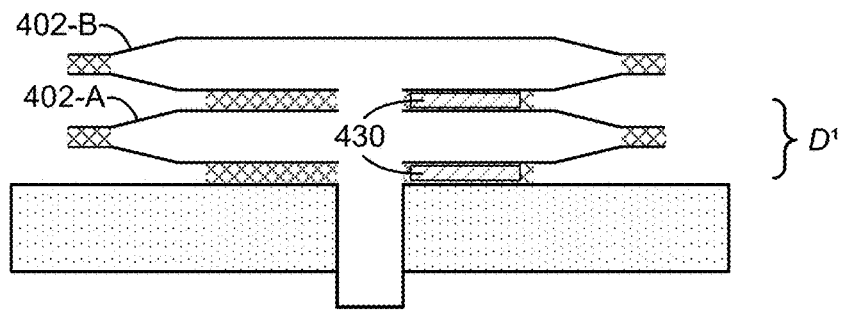
FIGS. 5A-5C show cross-sectional views of a representative bladder in accordance with some embodiments.
Figure 5B:
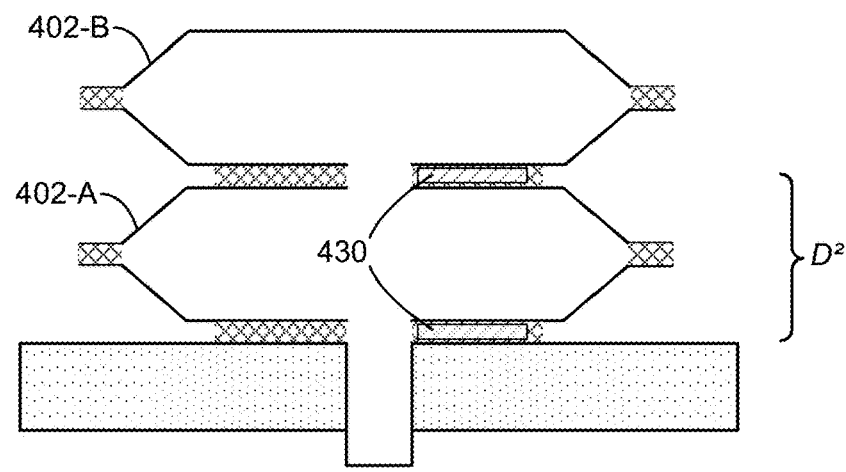
Figure 5C:
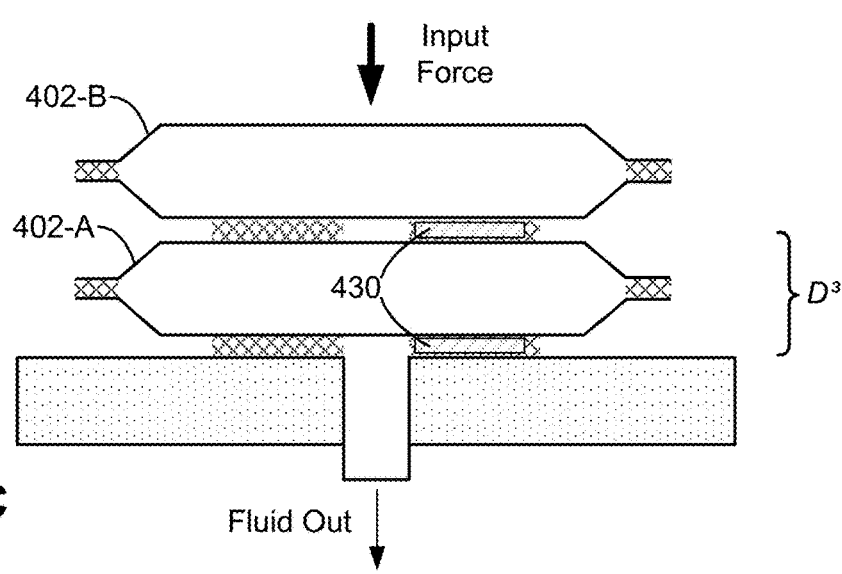

FIGS. 5A-5C show cross-sectional views of a representative bladder 204 in accordance with some embodiments. The representative bladder 204 includes a structure similar to the structure of the bladders discussed in FIG. 4. For example, the bladder includes (i) a first bellows 402-A and (ii) a second bellows 402-B positioned on top of the first bellows 402-A. The bladder 204 also includes one or more sensors 430 integrated with the first bellows 402-A and the second bellows 402-B. The sensors 430 are configured to monitor a state of the bladder 204. For example, the sensors 430 are configured to provide sensor data to a controller 214 based on the monitored state of the bladder 204. Specifically, the sensor 430 may provide data to the controller that the bladder 204 has been inflated by a first amount, and in response to receiving the data, the controller may further increase (or decrease) inflation of the bladder 204. In this way, the sensors 430 create a feedback loop that improves performance of the wearable device 120. The sensor data may include one or more of: (i) measurements of the bladder's expansion, (ii) measurements of the bladder's contraction, and (iii) measurements of the fluid pressure within the bladder.

Some embodiments use displacement sensors 430. For example, the sensor 430 includes an upper component and a lower component, and the sensor 430 is configured to monitor a distance between the upper component (e.g., metal plate) and the lower component (e.g., another metal plate). In such embodiments, the displacement sensor may measure capacitance. Alternatively, or in addition, in some embodiments, the sensor 430 is a force/pressure sensor. In addition, in some embodiments, each bladder 204 of the wearable device 120 includes an instance of the sensor 430. In such embodiments, each sensor 430 may provide data to the controller that its respective bladder 204 has been inflated by a first amount, and in response to receiving the data, the controller may further increase (or decrease) inflation of one or more of the bladders 204. It is also noted that the controller may forgo increasing (or decreasing) inflating when the data indicates that the bladder is at the desired position or pressure.

In some embodiments, the sensor 430 can be used to turn the bladder 204 into an input device (i.e., a button). For example, with reference to FIG. 5A, the bladder 204 is unpressurized (i.e., is in an unpressurized state). In such a state, the components of the sensor 430 are separated by a first distance ($D^1$), and the sensor 430 provides first sensor data to the controller indicating the first distance ($D^1$) of separation. However, with reference to FIG. 5B, the bladder 204 is pressurized ("Fluid In") (i.e., is in a pressurized state). As discussed above, the bladder 204 is configured to expand and contract according to fluid pressure within the bladder 204. Thus, in the pressurized state, the components of the sensor 430 are separated by a second distance ($D^2$), which is greater than the first distance ($D^1$), and the sensor 430 provides second sensor data to the controller indicating the second distance ($D^2$) of separation. In embodiments where the sensor 430 is a displacement sensor, the first and second sensor data may be capacitance measurements, which correspond to a distance (i.e., a gap) between the upper and lower components of the displacement sensor 430.

With reference to FIG. 5C, the user presses ("Input Force") on the bladder 204 while the bladder 204 is inflated (e.g., while the bladder 204 is in the pressurized state). In doing so, the user forces some of the fluid out of the bladder 204, thereby causing the components of the sensor 430 to be separated by a third distance ($D^3$), which is less than the second distance ($D^2$). In response, the sensor 430 provides third sensor data to the controller indicating the third distance ($D^3$) of separation. In some embodiments, a different between the second distance ($D^2$) and third distance ($D^3$) satisfies a touch threshold. The controller, upon receiving the third sensor data and with the understanding that the bladder is in the pressurized state, processes the third data sensor as a touch input (e.g., in response to determining that the difference between the second distance ($D^2$) and third distance ($D^3$) satisfies the touch threshold). In this way, a user can press an inflated bladder, as if it were a button, and the sensor 430 can provide data to the controller indicating depression of the bladder, which the controller subsequently processes as a button press. The bladder 204 is inflated during the touch input, which provides tactile feedback to the user that resembles depression of a physical button.

In those embodiments where the sensor 430 is a force/pressure sensor, the first and second sensor data indicate an amount of force applied to the sensor 430, as opposed to a distance separating components of the sensor 430. The force sensor 430 can indicate to the controller that the bladder is inflated (or is sufficiently inflated, or is deflated). The force sensor 430 can also measure input forces applied to the bladder 204 by the user. Therefore, the force applied to the sensor 430 in FIG. 5C, caused by the user pressing on the bladder 204, is different from (e.g., greater than) than the force applied to the sensor 430 in FIG. 5B. The controller, upon receiving the third sensor data from the force sensor 430 (and in some embodiments with the understanding that the bladder is in the pressurized state), processes the third data sensor as a touch input when the third sensor data indicates that the amount of force applied to the sensor 430 satisfies a touch threshold. In some embodiments, the force/pressure sensor is positioned on the surface 409 of outermost bellows 402, instead of the sensor position illustrated in FIGS. 5A-5C.

To summarize, the force a respective bladder 204 exerts on a user depends on fluid pressure (e.g., supply pressure) and the distance at which the bladder contacts the user. To ensure that the same force is prescribed to all users (e.g., to avoid large force deviations from user to user), the wearable device 120 can include one or more sensors 430 (e.g., each bladder 204 includes a sensor 430) to monitor the state of the bladder 204, and provide feedback regarding the force prescribed to the user (or measurements of the bladder's expansion, and then interpolate force from those measurements). The sensor 430 may be positioned in various locations within a respective bladder 204, and the illustrated example is one possible location.

An example method is provided to give additional context to the description of FIGS. 5A-5C. The method includes instructing, by the wearable device 120 or the computer system 130, a source 210 to transition at least one bladder 204 of the wearable device 120 from an unpressurized state to a pressurized state, where the bladder 204 is associated with a function when transitioned to the pressurized state. The method also includes, while the inflatable bladder is in the pressurized state: (i) detecting, by a sensor 430 of the wearable device 120, depression (e.g., the "Input Force" in FIG. 5C) of the inflated bladder 204, and (ii) generating, by the sensor 430, sensor data based on the detecting. The sensor data may include various measurements, including one or more of (i) measurements of the bladder's expansion, (ii) measurements of the bladder's contraction, (iii) measurements of the fluid pressure within the bladder, and (iv) measurements of pressure on the bladder. In some embodiments, the wearable device 120 sends the generated sensor data to the computer system 130, and the following steps are performed by the computer system 130. In some embodiments, the following steps may be performed by the wearable device 120.

The method also includes, in response to detecting the depression of the inflatable bladder: (i) determining whether the magnitude of the depression satisfies a touch threshold, based on the sensor data, and (ii) in accordance with a determination that the magnitude of the depression satisfies the touch threshold, executing the function. Importantly, depression of the bladder 204, while the bladder 204 is in the pressurized state (i.e., while the bladder 204 is inflated), provides tactile feedback to the user (e.g., depression of the bladder resembles depression of a physical button). In some embodiments, the function may be a function at the wearable device 120 (e.g., silencing an alert generated by the wearable device 120), while in other embodiments executing the function includes sending an instruction to another electronic device (e.g., the computer system 130 or the head-mounted display 110) according to the function. For example, an alert (or some other message) may be displayed on the head-mounted display 110, and the user may use the wearable device 120 to acknowledge the alert (e.g., select an affordance displayed in the message).

In some embodiments, the wearable device 120 includes a display. For example, the artificial-reality device 900 in FIG. 9 includes a display 904. In such embodiments, executing the function includes modifying a user interface displayed on the display.

In some embodiments, the sensor 430 is used to measure (i.e., evaluate) coupling (i.e., fit) of the wearable device 120 with the user's body. For example, if sensor data generated by the sensor 430 indicates that contact (measured in force/pressure measurements) between of the wearable device 120 and the user's body in below a pressure threshold, the controller can in turn inflate (partially or fully) one or more bladders 204 to create additional contact (i.e., friction) between the wearable device 120 and the user's body (i.e., so that contact between the wearable device 120 and the user's body satisfies the pressure threshold). Moreover, in some embodiments, IMU sensors 124 of the wearable device 120 can provide additional sensor data to the controller indicating undesired movement of the wearable device 120 (e.g., the IMU sensor data may indicate that the wearable device 120 slid down the user's arm slightly when the user raised his hand). Accordingly, the controller can inflate (partially or fully) one or more bladders 204 to create additional contact (i.e., friction) between the wearable device 120 and the user's body to prevent the detected slippage.

Figure 6C:
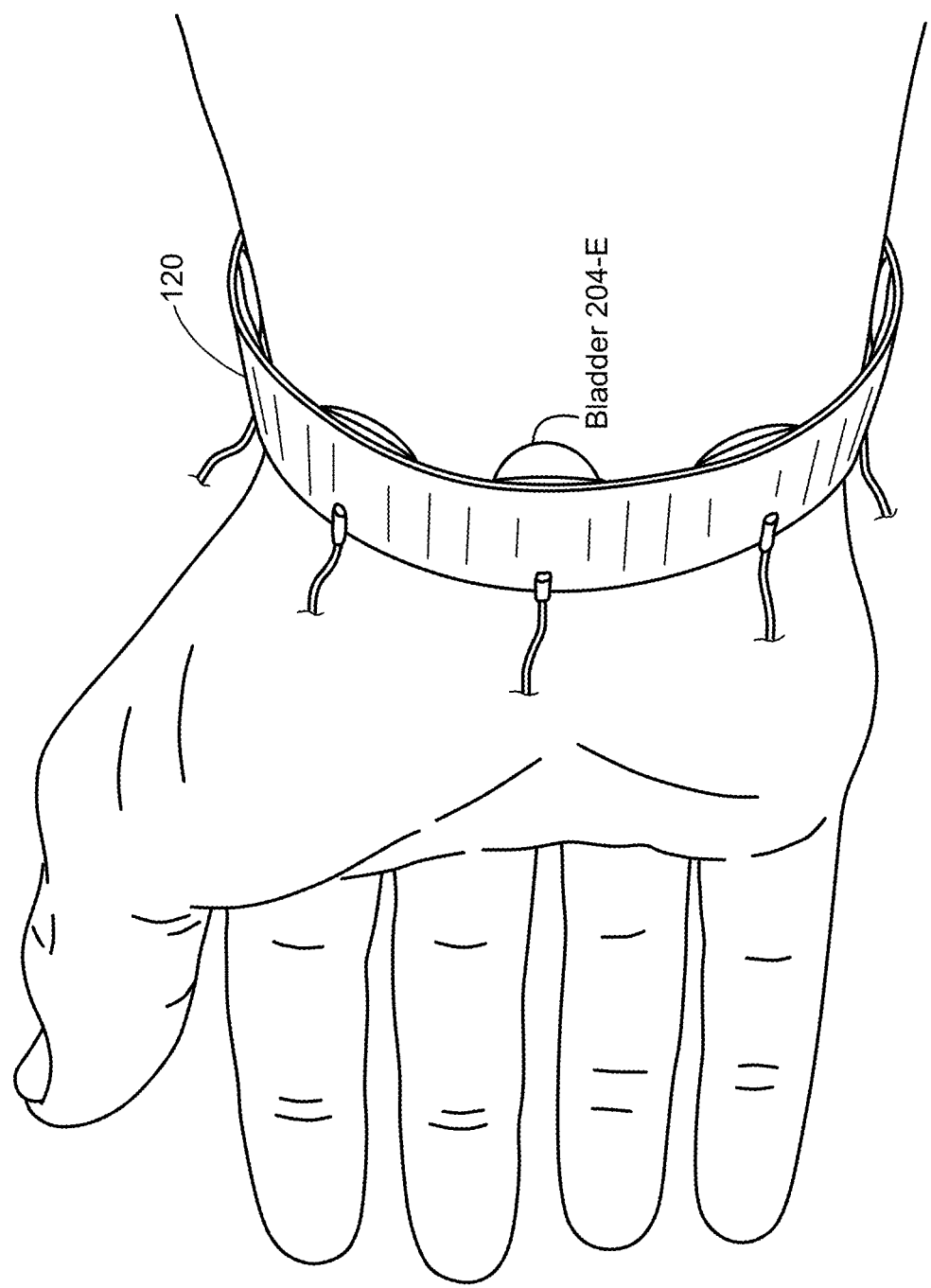
FIG. 6C shows an example of a representative wearable device attached to a user.

FIGS. 6A and 6B show examples of a representative wearable device 120 in different states in accordance with some embodiments. As shown in FIGS. 6A and 6B, the wearable device 120 includes a plurality of bladders 204-A, 204-B, . . . , 204-H integrated with a wearable structure 202. In some embodiments, a center-to-center distance between adjacent bladders 204 is approximately 24 mm. Each bladder 204 is fluidically coupled with a distinct conduit 208. FIG. 6A shows each bladder 204 of the wearable device 120 unpressurized (i.e., each bladder 204 is in an unpressurized state). In contrast, FIG. 6B shows a few of the bladders 204 pressurized (i.e., in a pressurized state). For example, bladders 204-A, 204-E, and 204-H are inflated to a threshold pressure, such that these bladders 204 are deemed to be in a pressurized state. Thus, a user wearing the wearable device 120 of FIG. 6B, as shown in FIG. 6C, experiences multiple haptic stimulations resulting from the bladders 204-A, 204-E, and 204-H contacting his or her body (e.g., the bladder 204-E in FIG. 6C is touching the user's wrist as a result of being inflated to the threshold pressure). It is noted that the conduits 208 shown in FIGS. 6A-6C may be integrated with the wearable structure 202 (or some other garment) to hide the conduits 208 from view.

Figure 6D:
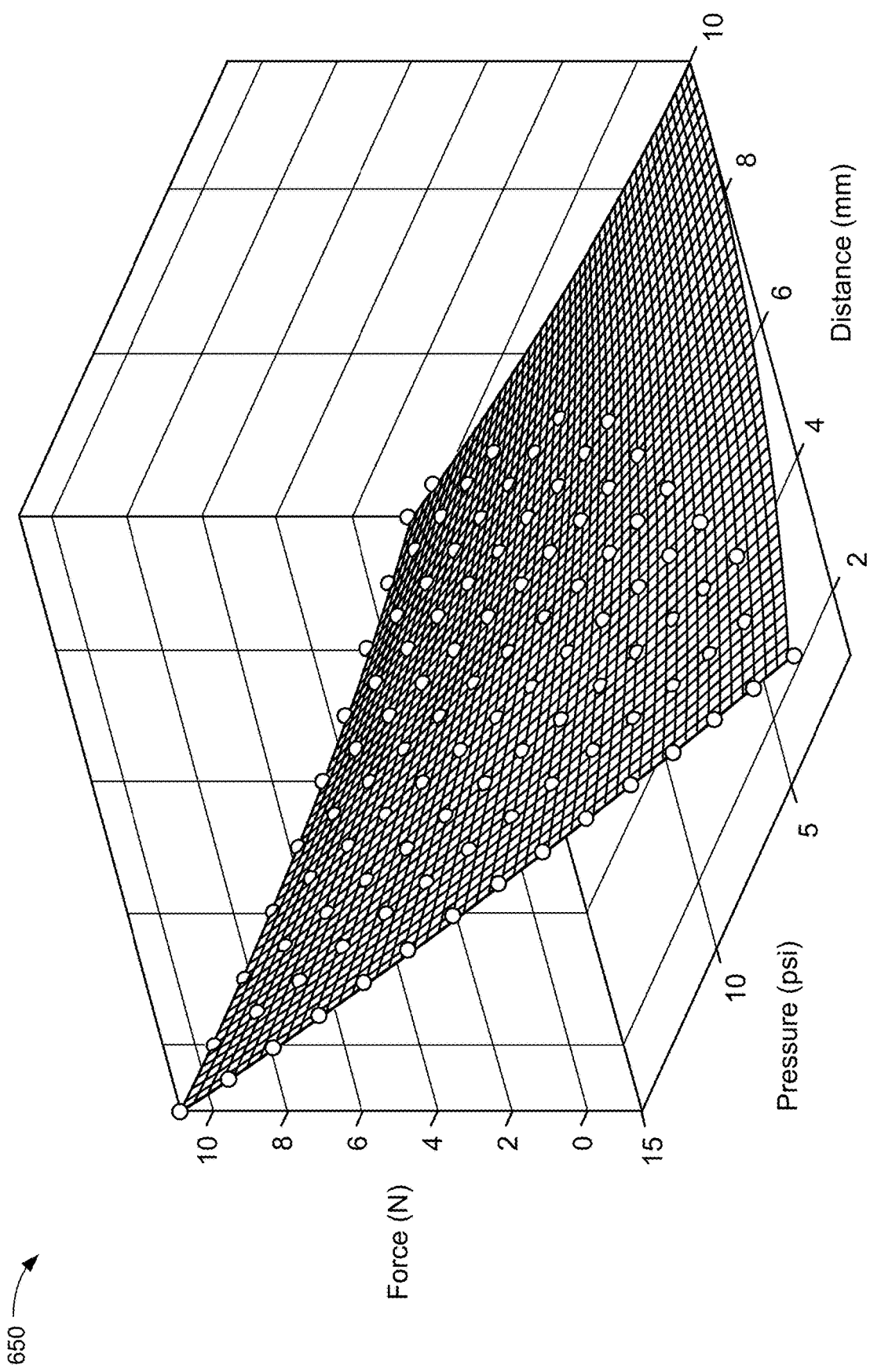
FIG. 6D shows a graph illustrating forces applied to a user based on a pressure and distance.

FIG. 6D shows a graph 650 illustrating Force (N) applied to a user based on a Pressure (psi) and a Distance (mm). "Pressure" corresponds to a supply pressure input into a respective bladder 204, while "Distance" corresponds to a separation distance between the respective bladder 204 and the user. As shown, the greatest force (e.g., greater than 10 N) is applied to the user when "Distance" is minimized and "Pressure" is maximized. The graph 650 also shows that, at the same pressure (e.g., 15 psi), different forces are applied to the user (e.g., as separation distance increases, force applied decreases). Thus, another important factor in how much force can be applied to a user is a bladder's expandability/extendibility. For example, if a bladder 204 can only extend 4 mm and the separation distance is also 4 mm, then the amount of force capable of being applied to the user will be essentially zero.

Figure 7G:
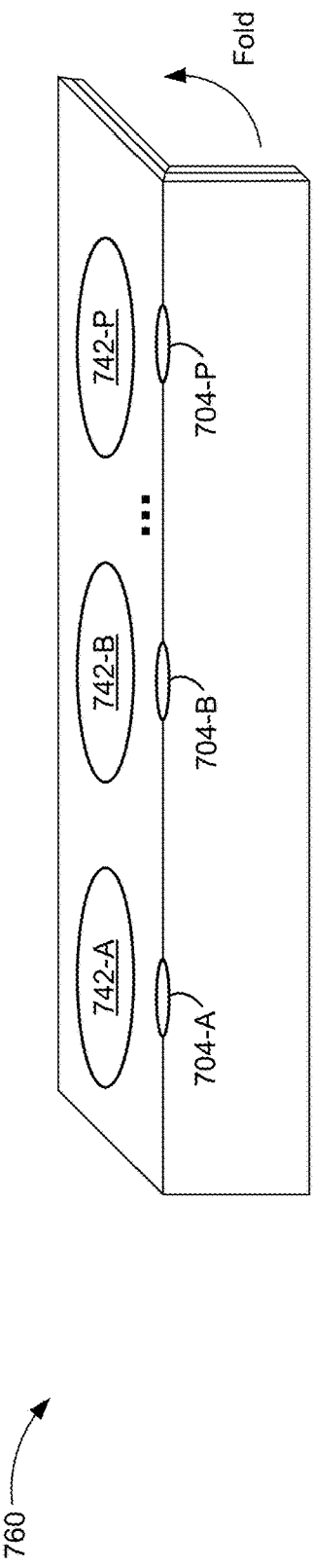

FIGS. 7A-7H illustrate a process of fabricating an example wearable device 120 in accordance with some embodiments. The process begins at step 700 by providing a polymer layer 702. In some embodiments, the polymer layer 702 is made from an elastic polymer, including various thermoplastic elastomers, such as thermoplastic polyurethane (TPU) and the like (e.g., polyester TPU). TPU (and similar materials) is the preferred material because TPU is flexible, yet durable and puncture resistant. As shown, the polymer layer 702 includes multiple conduit insertion holes/openings 704-A, 704-B, . . . 704-P and multiple bladder access openings 706-A, 706-B, . . . 706-P. Each of the bladder access openings 706-A, 706-B, . . . 706-P is located opposite an opening 404 (and opening 414) in FIG. 4. As shown in FIG. 7A, the conduit insertion holes 704-A, 704-B, . . . 704-P are located at a distance D from an edge of the polymer layer 702. In some embodiments, the distance D is approximately half the width of the polymer layer 702. For example, if the polymer layer 702 is 40 mm wide, then the conduit insertion holes 704-A, 704-B, . . . 704-P are located at 20 mm from the edge of the polymer layer 702. In some other embodiments, the distance D is greater than (or less than) half the width of the polymer layer 702. For example, if the polymer layer 702 is 40 mm wide, then the conduit insertion holes 704-A, 704-B, . . . 704-P may be located at 30 mm (or some other location) from the edge of the polymer layer 702. Various other widths are possible, and 40 mm is merely one possible example that is used herein primarily to provide context.

In the illustrated embodiments, the diameter of each of the bladder access openings 706-A, 706-B, . . . 706-P is greater than the diameter of each of the conduit insertion holes 704-A, 704-B, . . . 704-P. However, in other embodiments, the diameter of each of the bladder access openings 706-A, 706-B, . . . 706-P may be less than or equal to the diameter of each of the conduit insertion holes 704-A, 704-B, . . . 704-P. The diameter of each of the conduit insertion holes 704-A, 704-B, . . . 704-P is dependent on (and corresponds to) the diameter of the conduit 208 inserted therein.

At this stage, the polymer layer 702 defines the bladder access openings 706-A, 706-B, . . . 706-P (e.g., circular, or some other shape) and the conduit insertion holes 704-A, 704-B, . . . 704-P (e.g., circular, or some other shape). The polymer layer 702 includes opposing first and second surfaces. Next, multiple adhesives 708-A, 708-B, . . . 708-P are attached to (e.g., deposited on) the first surface of the polymer layer 702. Specifically, a respective adhesive 708 is aligned with one of the multiple bladder access openings 706-A, 706-B, . . . 706-P (e.g., a first adhesive 708-A and a first opening 706-A are coaxially aligned). In some embodiments, the adhesive 708 is printed onto the polymer layer 702, whereas in other embodiments the adhesive 708 is placed onto the polymer layer 702. In addition, in some embodiments, the process includes heating the adhesive 708 during or after attaching the adhesive 708 to the first surface of the polymer layer 702. The adhesive 708 may be various adhesives (e.g., epoxy or glue) suitable for coupling polymers (e.g., thermoplastics) together. Each adhesive 708 has a shape that compliments the shape of the bladder access openings 706. For example, in the illustrated embodiments, the bladder access openings 706-A, 706-B, . . . 706-P are circular, and therefore, each adhesive 708 is ring shaped (e.g., annular). Thus, each adhesive 708 has an inner and outer diameter.

The process further includes, at step 710, attaching multiple first bladder layers 712-A, 712-B, . . . 712-P to the first surface of the polymer layer 702. Specifically, a respective first bladder layer 712 is positioned on one of the deposited adhesives 708 and also aligned with one of the multiple bladder access openings 706-A, 706-B, . . . 706-P (e.g., the first bladder layer 712-A, the first adhesive 708-A, and the first opening 706-A are coaxially aligned). The first bladder layer 712 corresponds to the layer of the first bellows 402-A that defines the opening 404 in FIG. 4. Thus, each of the multiple first bladder layers 712-A, 712-B, . . . 712-P has a central opening, which is an instance of the opening 404 in FIG. 4. The diameter of the central opening may be the same as or different from (e.g., less than) the diameter of the bladder access opening 706.

As shown in FIG. 7B, the outer diameter of each first bladder layer 712 is greater than the outer diameter of the corresponding adhesive 708 (but the inner diameter of the corresponding adhesive 708 is substantially the same as the diameter of the bladder access opening 706). In this way, only an inner region of the first bladder layer 712 is fixed to the polymer layer 702, and consequently (as shown in FIG. 4), the outer region of the first bladder layer 712 lifts away from the polymer layer 702 when the first bellows 402-A is pressurized. It is noted that, in other embodiments, the outer diameter of each first bladder layer 712 is substantially the same as the outer diameter of the corresponding adhesive 708. In such embodiments, the first bladder layer 712 is prevented from lifting away from the polymer layer 702 when the first bellows 402 is pressurized.

In some embodiments, attaching the multiple first bladder layers 712-A, 712-B, . . . 712-P with the first surface of the polymer layer 702 includes pressing the multiple first bladder layers 712-A, 712-B, . . . 712-P and the first surface of the polymer layer 702 together using a heat press (e.g., user operated or automated). The pressing may last for approximately 30 seconds and may be performed at approximately 20 pounds-per-square inch (psi). Various other times and pressures may be used as well. The pressing ensures that the adhesive 708 adheres to the first bladder layer 712, thereby reducing the likelihood of delamination and air leaks during use. Additionally, the adhesive 708 may require heat to fully cure (e.g., 260° F. applied to cure the adhesive 708).

The process further includes, at step 720, attaching multiple adhesives 722-A, 722-B, . . . 722-P to the first bladder layers 712. Specifically, a respective adhesive 722 is aligned with one of the multiple first bladder layers 712-A, 712-B, . . . 712-P. In some embodiments, the adhesive 722 is printed onto the first bladder layer 712, whereas in other embodiments the adhesive 722 is placed onto the first bladder layer 712. In addition, in some embodiments, the process includes heating the adhesive 722 during or after attaching the adhesive 722 to the first bladder layer 712. As shown in FIG. 7C, the multiple adhesives 722-A, 722-B, . . . 722-P are ring shaped (e.g., annular). Thus, each adhesive 722 has an inner diameter and an outer diameter. The outer diameter of the multiple adhesives 722-A, 722-B, . . . 722-P matches the outer diameter of the first bladder layer 712. In addition, the multiple adhesives 722-A, 722-B, . . . 722-P are thin rings (e.g., the difference between the inner and outer diameters of the adhesive 722 is small relative to a difference between the inner and outer diameters of the adhesive 708). In some embodiments, the multiple adhesives 722-A, 722-B, . . . 722-P are 2 mm wide. Some advantages of the thin ring shape are discussed below with reference to step 730.

The process further includes, at step 730, attaching multiple second bladder layers 732-A, 732-B, . . . 732-P with the partially fabricated device. Specifically, a respective second bladder layer 732 is positioned on each one of the deposited adhesives 722 and each one of the first bladder layers 712, and also aligned with one of the multiple bladder access openings 706-A, 706-B, . . . 706-P. The second bladder layer 732 corresponds to the layer of the first bellows 402-A that defines part of the passage 406 in FIG. 4. In the illustrated embodiments (e.g., in steps 720 and 730), the adhesive 722 is located along a perimeter of the first bladder layer 712, and consequently (as shown in FIG. 4 with reference to the first bellows 402-A), only a perimeter (i.e., edge region) of the first bladder layer 712 is coupled with (e.g., adhered to) a perimeter (i.e., edge region) of the second bladder layer 732. The thin ring shape of the adhesive 722 is used to maximize vertical expansion of the first bellows 402-A in FIG. 4 (and the other bellows shown in FIG. 4). It is noted that if less vertical expansion of a bellows is desired, then a width of the adhesive 722 (i.e., the difference between the inner and outer diameters) can be increased.

In some embodiments, attaching the multiple second bladder layers 732-A, 732-B, . . . 732-P includes pressing the multiple first bladder layers 732-A, 732-B, . . . 732-P and the partially fabricated device together using a heat press (e.g., user operated or automated). The pressing may last for approximately 30 seconds and may be performed at approximately 20 pounds-per-square inch (psi). Various other times and pressures may be used as well. The pressing ensures that the adhesive 722 adheres to the second bladder layer 732, thereby reducing the likelihood of delamination and air leaks during use. Additionally, the adhesive 722 may require heat to fully cure.

In some embodiments, if only a single tier of bellows is desired, step 730 is replaced with step 740, and the process is completed. If multiple tiers of bellows are desired, the process continues, as described below.

The discussion above for steps 700-730 can be repeated any number of times to created additional bellows. For example, with reference to FIG. 4, the discussion above for steps 700-730 details the fabrication of a first tier of bellows, such as the bellows 402-A and the bellows 412-A in FIG. 4. The steps can, if desired, then repeat to create a second tier of bellows, such as the bellows 402-B and the bellows 412-B in FIG. 4. Importantly, if the second tier of bellows is the final tier of bellows to be fabricated, then step 740 replaces step 730. However, if a third tier of bellows is desired, then the second tier of bellows is created using steps 700 through 730. The discussion below describes how fabrication of the wearable device 120 is completed.

At this stage in the process (at step 740 in FIG. 7E), and for ease of discussion, a first tier of bellows has been fabricated (as described above in steps 700-730), and a second tier of bellows is partially fabricated (steps 700-720 have been repeated). Thus, the partially completed second tier of bellows includes: (i) multiple adhesives (e.g., instances of the adhesives 708) attached to each of the second bladder layers 732 from step 730, (ii) multiple third bladder layers (e.g., instances of the first bladder layers 712) positioned on the multiple adhesives and the second bladder layers 732 from step 730 (i.e., the third bladder layers and the second bladder layers are adjacent layers), and (iii) multiple thin-ring adhesives (e.g., instances of the adhesives 722) attached to perimeters of the third bladder layers.

Next, multiple top bladder layers 742-A, 742-B, . . . 742-P are positioned on the multiple thin-ring adhesives and the third bladder layers (i.e., the third bladder layers and the top bladder layers are adjacent layers). To provide some context, the top bladder layer 742 corresponds to the top layer (e.g., surface 409) of the second bellows 402-B in FIG. 4. The top bladder layer 742 does not include any openings, in contrast to the other bladder layers discussed above, each of which has an opening. Thus, with reference to FIG. 4, the top bladder layer 742 seals the first bellows 402-A and the second bellows 402-B.

The process further includes, at step 750, connecting multiple conduits 208-A, 208-B, . . . 208-P to the multi-tier structure fabricated through step 740. As shown, an adhesive layer 752 is also provided, which is configured to adhere to the polymer layer 702. The adhesive layer 752 is used to secure the multiple conduits 208-A, 208-B, . . . 208-P to the polymer layer 702, and also create an air tight seal with the polymer layer 702. The adhesive layer 752 has multiple bladder access openings 754-A, 754-B, . . . 754-P and multiple puncture points 756-A, 756-B, . . . 756-P. To connect the conduits 208, each of the multiple conduits 208-A, 208-B, . . . 208-P is fed through one of the conduit insertion holes 704-A, 704-B, . . . 704-P and then through one of the puncture points 756-A, 756-B, . . . 756-P (as illustrated by the arrow direction in FIG. 7F). Thereafter, an end of each conduit 208 is inserted in and coupled to one of the bladder access openings 754-A, 754-B, . . . 754-P (e.g., arrows of conduit lines 208 shown in FIG. 7F loop back upwards to the corresponding opening 754 after behind fed through the corresponding puncture point 756). The puncture points 756-A, 756-B, ... 756-P are shaped openings that are configured to prevent the conduit 208 from sliding in a direction opposite the feed direction shown in FIG. 7F. In some embodiments, the end of each conduit 208 includes a valve, which is described above with reference to FIGS. 3A and 3B.

The process further includes (at step 760) folding the polymer layer 702 and the adhesive layer 752 in the manner shown in FIG. 7G. The folded structure is then pressed together, which may or may not include heat. In some embodiments, the fold is made along a center line 751 of the polymer layer 702, shown in FIG. 7F. Alternatively, in some embodiments, the fold is made closer to or farther from the bladder access openings 706-A, 706-B, ... 706-P. The multiple conduit insertion holes 704-A, 704-B, ... 704-P may be positioned along the fold line or offset from the fold line in either direction.

Because the adhesive layer 752 forms the bottom of the structure, the adhesive layer 752 folds onto and adheres to itself. In some embodiments, after or during the folding step 760, heat and/or pressure is applied to the folded structure. The heat and/or pressure ensure that the adhesive layer 752 adheres to itself, thereby reducing the likelihood of delamination and air leaks during use.

Figure 7H:
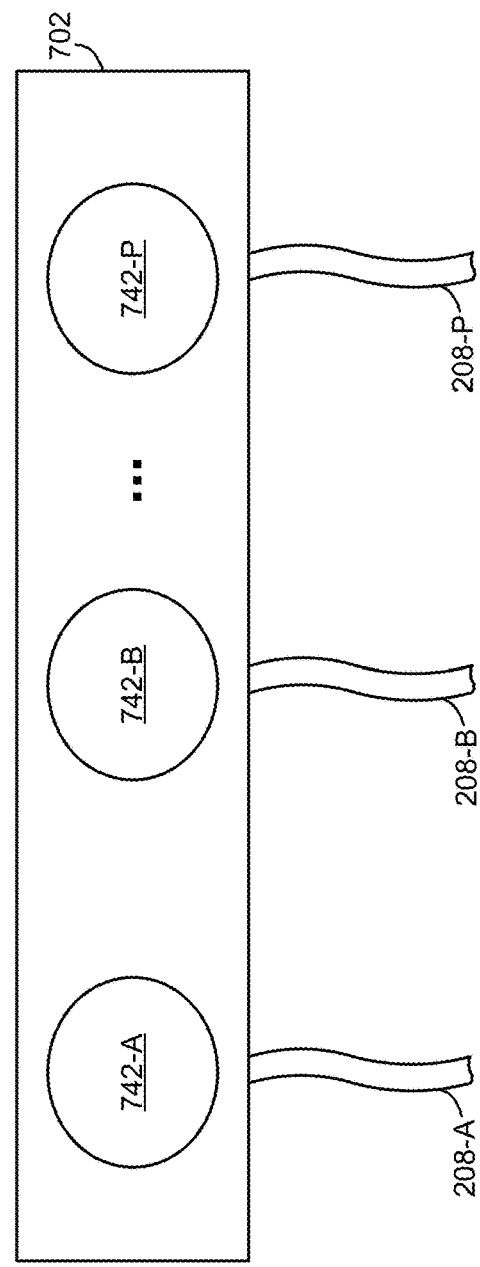

FIG. 7H shows a top view of a finished wearable device 120. It is noted that the polymer layer 702 and the adhesive layer 752 together compose, at least partially, the wearable structure 202. The wearable structure 202 may include one or more additional layers, such as material that at least partially conceals the polymer layer 702 (and potentially the bellows). For example, the wearable structure 202 can also include fabric or other wearable material, such as leather or plastic (e.g., the wearable device 120 may be a fitness or smart watch). Moreover, the one or more additional layers may include one or more instances of the polymer layer 702 and/or the adhesive layer 752.

It is noted that the process described above is merely one example process for fabricating the wearable devices 120 discussed herein. In other embodiments, the bladders 204 of the wearable device 120 (or layers that form the bladders 204) are folded in a predetermined manner (e.g., origami-type bellows). The folds allow the bellows to lie flat when unpressurized and expand, according to the design of the folds, when pressurized. Put another way, the bellows collapses on itself (i.e., folds) when unpressurized, and the bellows unfolds itself when pressurized. In some embodiments, the folds are similar to the structure of an accordion's bellows.

Figure 8:
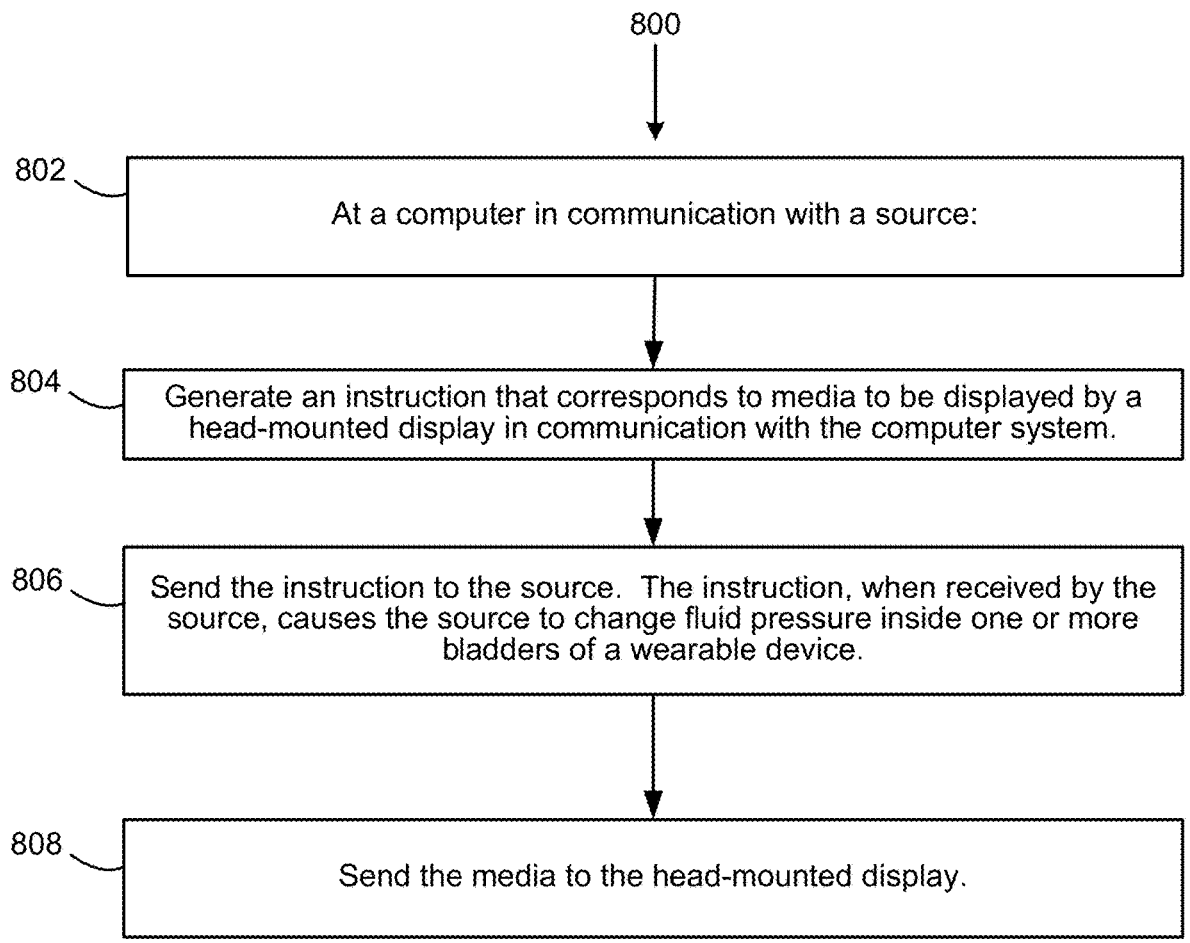
FIG. 8 is a flow diagram illustrating a method of creating haptic stimulations in accordance with some embodiments.

FIG. 8 is a flow diagram illustrating a method 800 of creating haptic stimulations in accordance with some embodiments. The steps of the method 800 may be performed (802) by a computer 130. FIG. 8 corresponds to instructions stored in a computer memory or computer readable storage medium (e.g., the memory of the computer system 130). For example, the operations of the method 800 are performed, at least in part, by a communication interface (e.g., similar to the communication interface 126) and a virtual-reality/augment reality generation module (e.g., part of the engine 134). It is noted that the method described below can be implemented with any of the wearable devices discussed above.

The method 800 includes generating (804) an instruction that corresponds to media (e.g., visual data) to be displayed by a head-mounted display 110 in communication the computer system (and/or corresponds to information received from one or more sensors 124 of the wearable device 120 and/or information received from one or more sensors 114 of the head-mounted display 110). In some embodiments, the computer system generates the instruction based on information received from the sensors on the wearable device. Alternatively or in addition, in some embodiments, the computer system generates the instruction based on information received from the sensors on the head-mounted display. For example, cameras (or other sensors 114) on the head-mounted display may capture movements of the wearable device, and the computer system can use this information when generating the instruction.

The method 800 further includes sending (806) the instruction to a fluid source 210 in communication with the computer system (e.g., send the instruction in a communication signal from a communication interface). The instruction, when received by the source, causes the source to change a pressure inside one or more bladders of the wearable device 120. In doing so, a wearer of the wearable device experiences a haptic stimulation that corresponds to the visual data. In some embodiments, the instruction specifies the change in the pressure to be made by the source. In some situations, instead of the computer system sending the instruction to the source, the computer system sends the instruction to the wearable device. In response to receiving the instruction, the wearable device sends the instruction to the source. The source is discussed in further detail above with reference to FIG. 2A.

After (or while, or before) sending the instruction, the method 800 also includes sending (808) the media to the head-mounted display. For example, the head-mounted display may receive visual data from the computer system, and may in turn display the visual data on its display(s). As an example, if the computer system receives information from the sensors 124 of the wearable device 120 that the user has closed his fingers around a position corresponding to a coffee mug in the virtual environment and raised his hand, a simulated hand in a virtual-reality application picks up the virtual coffee mug and lifts it to a corresponding height. Generating and sending media is discussed in further detail above with reference to FIG. 1.

In conjunction with displaying the visual data (or other media), one or more bladders of the wearable device are inflated or deflated to the desired pressure (as noted above). As an example, the wearable device may include: (i) a wearable structure attachable to a portion of a user's body; (ii) a plurality of bladders, integrated with the wearable structure, configured to expand and contract according to fluid pressure within each bladder, where each bladder of the plurality of bladders delivers (e.g., imparts) a haptic stimulation to the user wearing the wearable structure when the bladder expands a threshold amount; and (iii) at least one conduit configured to transport a fluid from the source to one or more bladders of the plurality of bladders, where the fluid from the source increases the fluid pressure within at least the one or more bladders. Accordingly, in this particular example, when the source changes the pressure inside one or more bladders of the wearable device (e.g., increases the pressure and expands the bladder by the threshold amount), each of the one or more bladders imparts a haptic stimulation to the user wearing the wearable structure.

In some embodiments, the computer and the head-mounted display together form an artificial-reality system. Furthermore, in some embodiments, the artificial-reality system is a virtual-reality system 1100. Alternatively, in some embodiments, the artificial-reality system is an augmented-reality system 1000 or artificial-reality system 900. In some embodiments, the visual data presented to the user by the artificial-reality system includes visual media displayed on one or more displays of the virtual-reality or augmented-reality system.

Embodiments of this disclosure may include or be implemented in conjunction with various types of artificial-reality systems. Artificial reality may constitute a form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, which are used, for example, to create content in an artificial reality and/or are otherwise used in (e.g., to perform activities in) an artificial reality.

Artificial-reality systems may be implemented in a variety of different form factors and configurations. Some artificial reality systems are designed to work without near-eye displays (NEDs), an example of which is the AR system 900 in FIG. 9. Other artificial reality systems include an NED, which provides visibility into the real world (e.g., the AR system 1000 in FIG. 10) or that visually immerses a user in an artificial reality (e.g., the VR system 1100 in FIG. 11). While some artificial reality devices are self-contained systems, other artificial reality devices communicate and/or coordinate with external devices to provide an artificial reality experience to a user. Examples of such external devices include handheld controllers, mobile devices, desktop computers, devices worn by a user (e.g., a wearable device 120), devices worn by one or more other users, and/or any other suitable external system.

Figure 9:
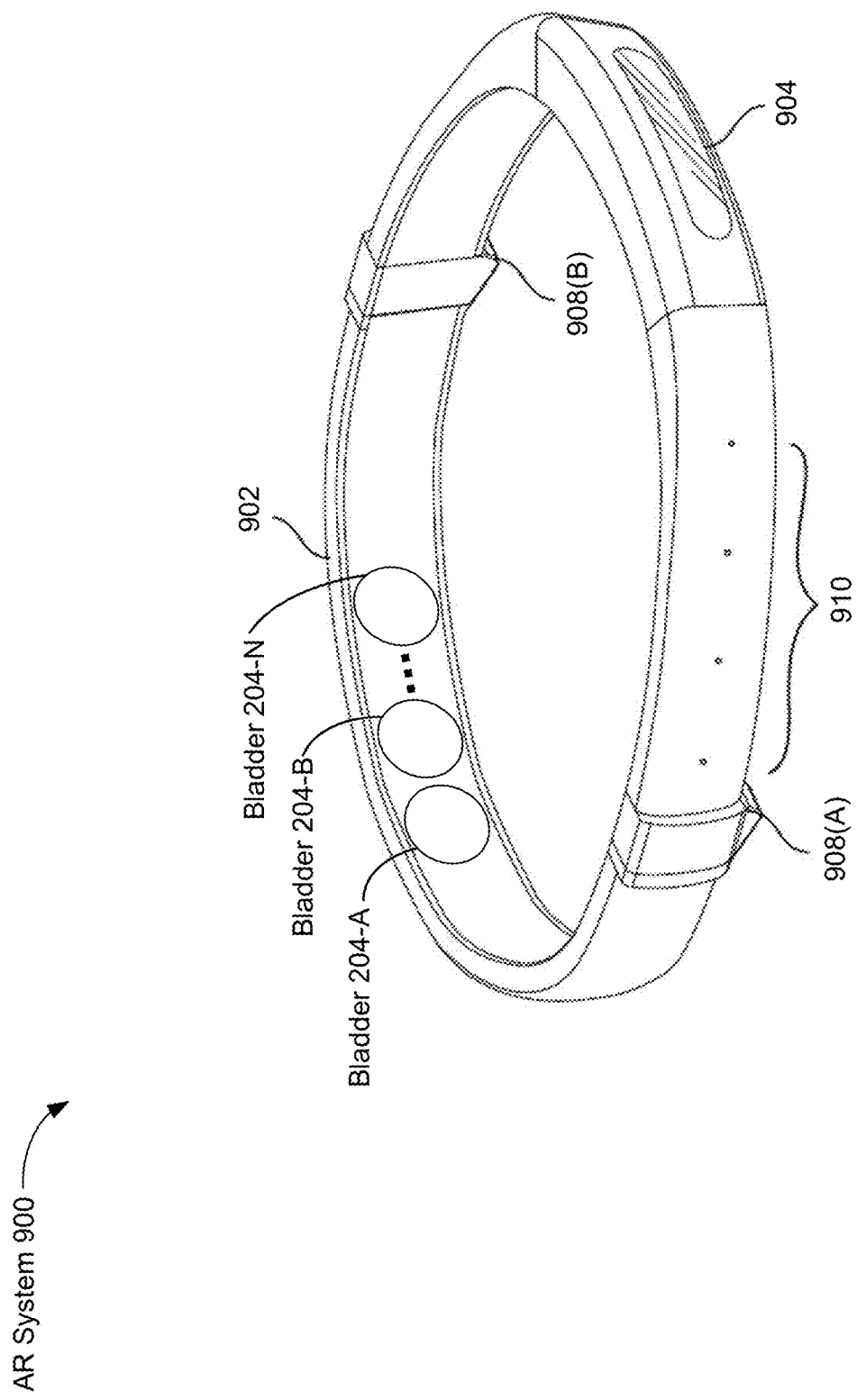
FIG. 9 illustrates an embodiment of an artificial-reality device.
Figure 10:
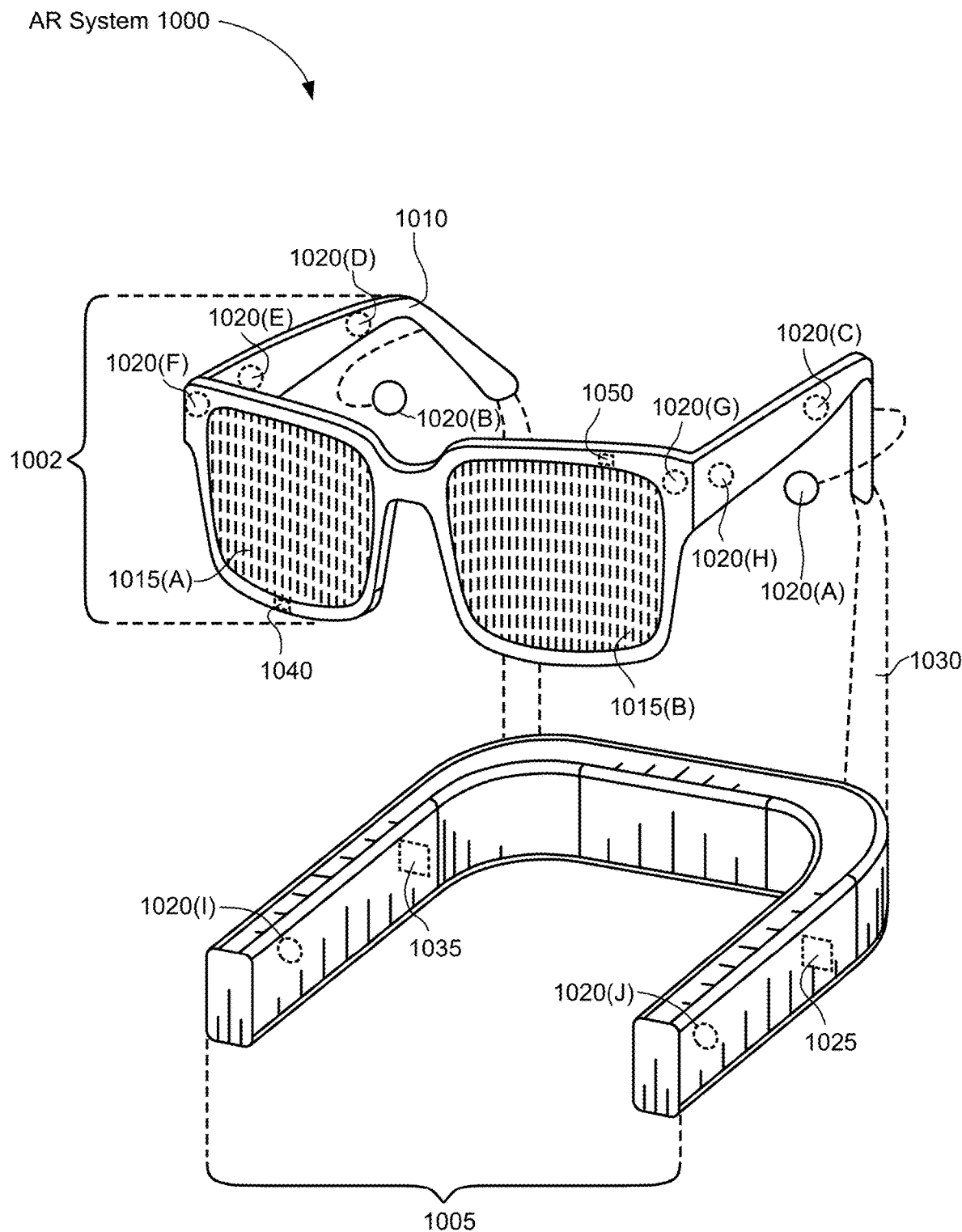
FIG. 10 illustrates an embodiment of an augmented-reality headset and a corresponding neckband.
Figure 11:
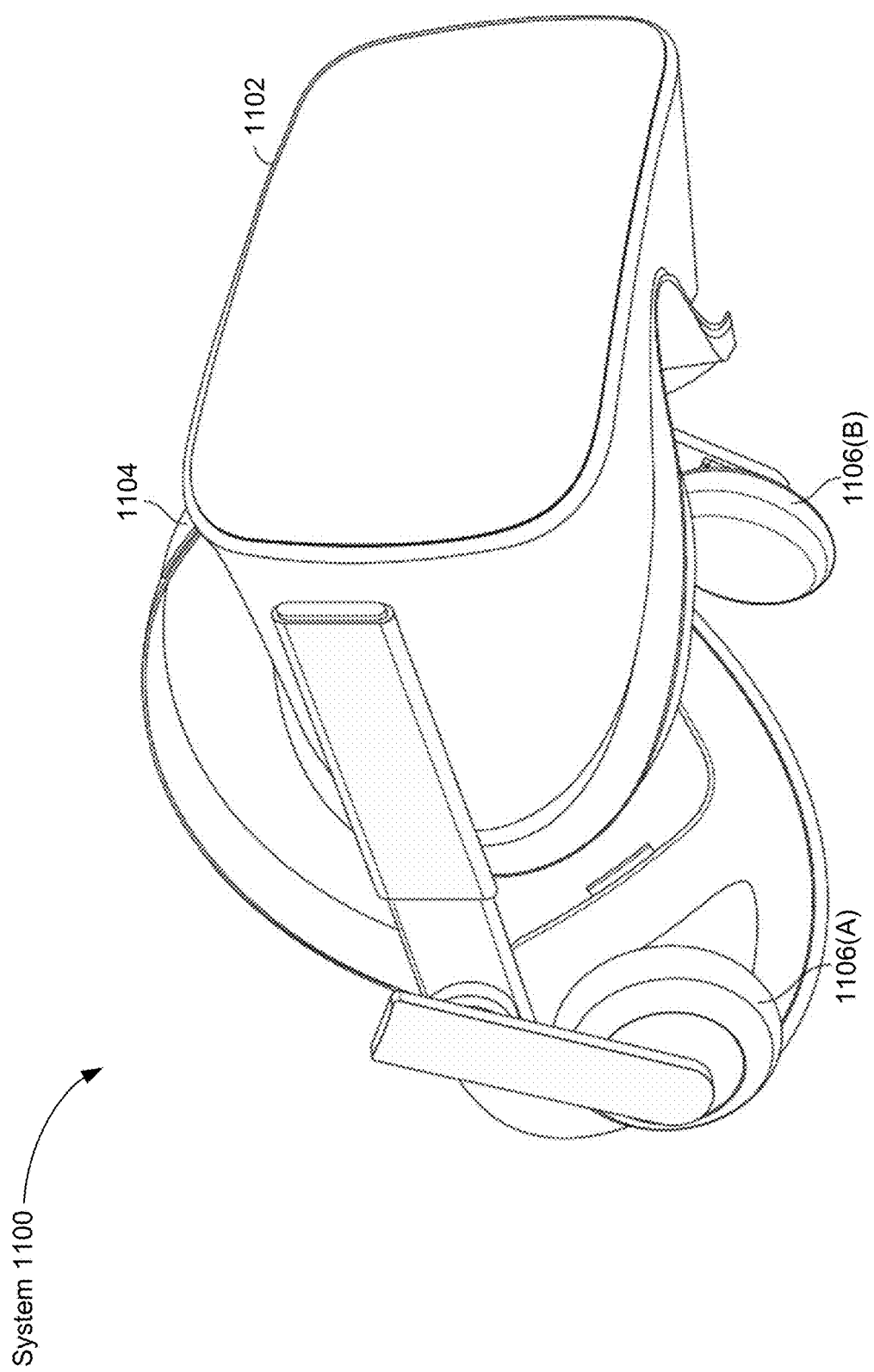
FIG. 11 illustrates an embodiment of a virtual-reality headset.

FIGS. 9-11 provide additional examples of the devices used in the system 100. The AR system 900 in FIG. 9 generally represents a wearable device dimensioned to fit about a body part (e.g., a head) of a user. The AR system 900 may include the functionality of the wearable device 120, and may include additional functions not described above. As shown, the AR system 900 includes a frame 902 (e.g., a band or wearable structure 202) and a camera assembly 904, which is coupled to the frame 902 and configured to gather information about a local environment by observing the local environment (and may include a display 904 that displays a user interface). The AR system 900 may also include one or more transducers. In one example, the AR system 900 includes output transducers 908(A) and 908(B) and input transducers 910. The output transducers 908(A) and 908(B) may provide audio feedback, haptic feedback, and/or content to a user, and the input audio transducers may capture audio (or other signals/waves) in a user's environment.

In some embodiments, the AR system 900 includes one or more instances of the wearable device 120 disclosed herein. For example, the AR system 900 may include one or more bladders 204 on the inside of the frame 902 (as shown) and also one or more bladders 204 on the outside of the frame 902 (not shown). In this way, the AR system 900 is able to create haptic stimulations, as discussed in detail above, and also include the novel input device described above with reference to FIGS. 5A-5C.

Thus, the AR system 900 does not include a near-eye display (NED) positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the AR system 900 may not include an NED, the AR system 900 may include other types of screens or visual feedback devices (e.g., a display screen integrated into a side of the frame 902).

The embodiments discussed in this disclosure may also be implemented in AR systems that include one or more NEDs. For example, as shown in FIG. 10, the AR system 1000 may include an eyewear device 1002 with a frame 1010 configured to hold a left display device 1015(A) and a right display device 1015(B) in front of a user's eyes. The display devices 1015(A) and 1015(B) may act together or independently to present an image or series of images to a user. While the AR system 1000 includes two displays, embodiments of this disclosure may be implemented in AR systems with a single NED or more than two NEDs.

In some embodiments, the AR system 1000 may include one or more sensors, such as the sensors 1040 and 1050 (e.g., instances of the sensors 114 in FIG. 1). The sensors 1040 and 1050 may generate measurement signals in response to motion of the AR system 1000 and may be located on substantially any portion of the frame 1010. Each sensor may be a position sensor, an inertial measurement unit (IMU), a depth camera assembly, or any combination thereof. The AR system 1000 may or may not include sensors or may include more than one sensor. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof. Sensors are also discussed above with reference to FIG. 1.

The AR system 1000 may also include a microphone array with a plurality of acoustic sensors 1020(A)-1020(J), referred to collectively as the acoustic sensors 1020. The acoustic sensors 1020 may be transducers that detect air pressure variations induced by sound waves. Each acoustic sensor 1020 may be configured to detect sound and convert the detected sound into an electronic format (e.g., an analog or digital format). The microphone array in FIG. 10 may include, for example, ten acoustic sensors: 1020(A) and 1020(B), which may be designed to be placed inside a corresponding ear of the user, acoustic sensors 1020(C), 1020(D), 1020(E), 1020(F), 1020(G), and 1020(H), which may be positioned at various locations on the frame 1010, and/or acoustic sensors 1020(I) and 1020(J), which may be positioned on a corresponding neckband 1005. In some embodiments, the neckband 1005 is an example of the computer system 130.

The configuration of the acoustic sensors 1020 of the microphone array may vary. While the AR system 1000 is shown in FIG. 10 having ten acoustic sensors 1020, the number of acoustic sensors 1020 may be greater or less than ten. In some embodiments, using more acoustic sensors 1020 may increase the amount of audio information collected and/or the sensitivity and accuracy of the audio information. In contrast, using a lower number of acoustic sensors 1020 may decrease the computing power required by a controller 1025 to process the collected audio information. In addition, the position of each acoustic sensor 1020 of the microphone array may vary. For example, the position of an acoustic sensor 1020 may include a defined position on the user, a defined coordinate on the frame 1010, an orientation associated with each acoustic sensor, or some combination thereof.

The acoustic sensors 1020(A) and 1020(B) may be positioned on different parts of the user's ear, such as behind the pinna or within the auricle or fossa. Or, there may be additional acoustic sensors on or surrounding the ear in addition to acoustic sensors 1020 inside the ear canal. Having an acoustic sensor positioned next to an ear canal of a user may enable the microphone array to collect information on how sounds arrive at the ear canal. By positioning at least two of the acoustic sensors 1020 on either side of a user's head (e.g., as binaural microphones), the AR device 1000 may simulate binaural hearing and capture a 3D stereo sound field around about a user's head. In some embodiments, the acoustic sensors 1020(A) and 1020(B) may be connected to the AR system 1000 via a wired connection, and in other embodiments, the acoustic sensors 1020(A) and 1020(B) may be connected to the AR system 1000 via a wireless connection (e.g., a Bluetooth connection). In still other embodiments, the acoustic sensors 1020(A) and 1020 (B) may not be used at all in conjunction with the AR system 1000.

The acoustic sensors 1020 on the frame 1010 may be positioned along the length of the temples, across the bridge, above or below the display devices 1015(A) and 1015(B), or some combination thereof. The acoustic sensors 1020 may be oriented such that the microphone array is able to detect sounds in a wide range of directions surrounding the user wearing AR system 1000. In some embodiments, an optimization process may be performed during manufacturing of the AR system 1000 to determine relative positioning of each acoustic sensor 1020 in the microphone array.

The AR system 1000 may further include or be connected to an external device (e.g., a paired device), such as a neckband 1005. As shown, the neckband 1005 may be coupled to the eyewear device 1002 via one or more connectors 1030. The connectors 1030 may be wired or wireless connectors and may include electrical and/or non-electrical (e.g., structural) components. In some cases, the eyewear device 1002 and the neckband 1005 may operate independently without any wired or wireless connection between them. While FIG. 10 illustrates the components of the eyewear device 1002 and the neckband 1005 in example locations on the eyewear device 1002 and the neckband 1005, the components may be located elsewhere and/or distributed differently on the eyewear device 1002 and/or the neckband 1005. In some embodiments, the components of the eyewear device 1002 and the neckband 1005 may be located on one or more additional peripheral devices paired with the eyewear device 1002, the neckband 1005, or some combination thereof. Furthermore, the neckband 1005 generally represents any type or form of paired device. Thus, the following discussion of neckband 1005 may also apply to various other paired devices, such as smart watches, smart phones, wrist bands, other wearable devices, hand-held controllers, tablet computers, or laptop computers.

Pairing external devices, such as a neckband 1005, with AR eyewear devices may enable the eyewear devices to achieve the form factor of a pair of glasses while still providing sufficient battery and computation power for expanded capabilities. Some or all of the battery power, computational resources, and/or additional features of the AR system 1000 may be provided by a paired device or shared between a paired device and an eyewear device, thus reducing the weight, heat profile, and form factor of the eyewear device overall while still retaining desired functionality. For example, the neckband 1005 may allow components that would otherwise be included on an eyewear device to be included in the neckband 1005 because users may tolerate a heavier weight load on their shoulders than they would tolerate on their heads. The neckband 1005 may also have a larger surface area over which to diffuse and disperse heat to the ambient environment. Thus, the neckband 1005 may allow for greater battery and computation capacity than might otherwise have been possible on a standalone eyewear device. Because weight carried in the neckband 1005 may be less invasive to a user than weight carried in the eyewear device 1002, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

The neckband 1005 may be communicatively coupled with the eyewear device 1002 and/or to other devices (e.g., wearable device 120). The other devices may provide certain functions (e.g., tracking, localizing, depth mapping, processing, storage, etc.) to the AR system 1000. In the embodiment of FIG. 10, the neckband 1005 may include two acoustic sensors 1020(I) and 1020(J), which are part of the microphone array (or potentially form their own microphone subarray). The neckband 1005 may also include a controller 1025 (e.g., an instance of the controller 214 in FIG. 2A) and a power source 1035.

The acoustic sensors 1020(I) and 1020(J) of the neckband 1005 may be configured to detect sound and convert the detected sound into an electronic format (analog or digital). In the embodiment of FIG. 10, the acoustic sensors 1020(I) and 1020(J) may be positioned on the neckband 1005, thereby increasing the distance between neckband acoustic sensors 1020(I) and 1020(J) and the other acoustic sensors 1020 positioned on the eyewear device 1002. In some cases, increasing the distance between the acoustic sensors 1020 of the microphone array may improve the accuracy of beamforming performed via the microphone array. For example, if a sound is detected by the acoustic sensors 1020(C) and 1020(D) and the distance between acoustic sensors 1020(C) and 1020(D) is greater than, for example, the distance between the acoustic sensors 1020(D) and 1020(E), the determined source location of the detected sound may be more accurate than if the sound had been detected by the acoustic sensors 1020(D) and 1020(E).

The controller 1025 of the neckband 1005 may process information generated by the sensors on the neckband 1005 and/or the AR system 1000. For example, the controller 1025 may process information from the microphone array, which describes sounds detected by the microphone array. For each detected sound, the controller 1025 may perform a direction of arrival (DOA) estimation to estimate a direction from which the detected sound arrived at the microphone array. As the microphone array detects sounds, the controller 1025 may populate an audio data set with the information. In embodiments in which the AR system 1000 includes an IMU, the controller 1025 may compute all inertial and spatial calculations from the IMU located on the eyewear device 1002. The connector 1030 may convey information between the AR system 1000 and the neckband 1005 and between the AR system 1000 and the controller 1025. The information may be in the form of optical data, electrical data, wireless data, or any other transmittable data form. Moving the processing of information generated by the AR system 1000 to the neckband 1005 may reduce weight and heat in the eyewear device 1002, making it more comfortable to a user.

The power source 1035 in the neckband 1005 may provide power to the eyewear device 1002 and/or to the neckband 1005 (and potentially the wearable device 120, while in other embodiments the wearable device 120 includes its own power source). The power source 1035 may include, without limitation, lithium-ion batteries, lithium-polymer batteries, primary lithium batteries, alkaline batteries, or any other form of power storage. In some cases, the power source 1035 may be a wired power source. Including the power source 1035 on the neckband 1005 instead of on the eyewear device 1002 may help better distribute the weight and heat generated by the power source 1035.

As noted, some artificial reality systems may, instead of blending an artificial reality with actual reality, substantially replace one or more of a user's sensory perceptions of the real world with a virtual experience. One example of this type of system is a head-worn display system, such as the VR system 1100 in FIG. 11, which mostly or completely covers a user's field of view. The VR system 1100 may include a front rigid body 1102 and a band 1104 shaped to fit around a user's head. the VR system 1100 may also include output audio transducers 1106(A) and 1106(B). Furthermore, while not shown in FIG. 11, the front rigid body 1102 may include one or more electronic elements, including one or more electronic displays, one or more IMUs, one or more tracking emitters or detectors, and/or any other suitable device or system for creating an artificial reality experience. Although not shown, the VR system 1100 may include the computer system 130.

Artificial-reality systems may include a variety of types of visual feedback mechanisms. For example, display devices in the AR system 1000 and/or the VR system 1100 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a user's refractive error. Some artificial reality systems also include optical subsystems having one or more lenses (e.g., conventional concave or convex lenses, Fresnel lenses, or adjustable liquid lenses) through which a user may view a display screen.

In addition to or instead of using display screens, some artificial reality systems include one or more projection systems. For example, display devices in the AR system 1000 and/or the VR system 1100 may include micro-LED projectors that project light (e.g., using a waveguide) into display devices, such as clear combiner lenses that allow ambient light to pass through. The display devices may refract the projected light toward a user's pupil and may enable a user to simultaneously view both artificial reality content and the real world. Artificial-reality systems may also be configured with any other suitable type or form of image projection system.

Artificial-reality systems may also include various types of computer vision components and subsystems. For example, the AR system 900, the AR system 1000, and/or the VR system 1100 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIGS. 9 and 11, the output audio transducers 908(A), 908(B), 1106(A), and 1106(B) may include voice coil speakers, ribbon speakers, electrostatic speakers, piezo-electric speakers, bone conduction transducers, cartilage conduction transducers, and/or any other suitable type or form of audio transducer. Similarly, the input audio transducers 910 may include condenser microphones, dynamic microphones, ribbon microphones, and/or any other type or form of input transducer. In some embodiments, a single transducer may be used for both audio input and audio output.

The artificial reality systems shown in FIGS. 9-11 may include tactile (i.e., haptic) feedback systems, which may be incorporated into headwear, gloves, body suits, handheld controllers, environmental devices (e.g., chairs or floor-mats), and/or any other type of device or system, such as the wearable devices 120 discussed herein. Additionally, in some embodiments, the haptic feedback systems may be incorporated with the artificial reality systems (e.g., the AR system 900 may include the haptic device 120 shown in FIG. 1). Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms, as described herein. Haptic feedback systems may be implemented independently of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, or business enterprises), entertainment purposes (e.g., for playing video games, listening to music, or watching video content), and/or for accessibility purposes (e.g., as hearing aids or vision aids). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios, including Wi-Fi, Bluetooth, global positioning system (GPS), cellular or other communication devices may also be used to determine a user's location relative to a radio transceiver or group of transceivers (e.g., a Wi-Fi router or group of GPS satellites). Acoustic sensors such as microphone arrays or 2D or 3D sonar sensors may also be used to determine a user's location within an environment. AR and VR devices (such as the systems 900, 1000, and 1100) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a Direction of Arrival ("DOA") analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy, including ear canal length and the positioning of the ear drum. The artificial reality device may provide an alignment and orientation guide, which the user may follow to customize the sound signal presented to the user based on a personal HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (e.g., using any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at a wearable device comprising (i) a wearable structure attachable to a portion of a user's body, (ii) an inflatable bladder integrated with the wearable structure along an axis, and (iii) a sensor integrated with the inflatable bladder, wherein the sensor comprises an upper component and a lower component, and wherein the upper component and lower component are substantially perpendicular to the axis:
    transitioning the inflatable bladder from an unpressurized state to a pressurized state, wherein the inflatable bladder is associated with an executable command when in the pressurized state;
    detecting, by the sensor, a magnitude of depression of the inflatable bladder, wherein the magnitude of depression comprises a distance between the upper component and the lower component;
    determining whether the magnitude of depression satisfies a predetermined distance threshold; and
    in accordance with determining that the magnitude of depression satisfies the predetermined distance threshold, executing the executable command.

2. The method of claim 1, wherein the inflatable bladder transitions from the pressurized state to the unpressurized state based at least in part on one or more received instructions from an electronic device distinct from the wearable device.

3. The method of claim 1, wherein depression of the inflatable bladder provides tactile feedback to a user of the wearable device.

4. The method of claim 1, wherein the wearable device further comprises a display, and executing the executable command includes modifying a user interface displayed on the display.

5. The method of claim 1, wherein the executable command is a command to play an audio tone.

6. The method of claim 1, further comprising:
    sending, to an electronic device distinct from the wearable device, an indication that the magnitude of depression satisfies the predetermined threshold.

7. The method of claim 1, further comprising:
    generating, by the sensor, sensor data based on the detecting; and
    storing, in a memory of the wearable device, the generated sensor data.

8. The method of claim 7, wherein the sensor data includes one or more of: (i) measurements of an expansion of the inflatable bladder, (ii) measurements of a contraction of the inflatable bladder, and (iii) measurements of fluid pressure within the inflatable bladder.

9. The method of claim 1, wherein transitioning the inflatable bladder from the unpressurized state to the pressurized state is in response to receiving an instruction from an electronic device distinct from the wearable device.

10. The method of claim 9, wherein pressurizing the inflatable bladder includes adding fluid to the inflatable bladder to increase fluid pressure of the inflatable bladder.

11. A system comprising:
    a wearable device comprising (i) a wearable structure attachable to a portion of a user's body, (ii) an inflatable bladder integrated with the wearable structure along an axis, and (iii) a sensor integrated with the inflatable bladder, wherein the sensor comprises an upper component and a lower component, and wherein the upper component and lower component are substantially perpendicular to the axis:
    wherein the wearable device is configured to:
    transition the inflatable bladder from an unpressurized state to a pressurized state, wherein the inflatable bladder is associated with an executable command when in the pressurized state;
    detect, by the sensor, a magnitude of depression of the inflatable bladder, wherein the magnitude of depression comprises a distance between the upper component and the lower component;
    determine whether the magnitude of depression satisfies a predetermined distance threshold; and
    in accordance with determining that the magnitude of depression satisfies the predetermined distance threshold, executing the executable command.

12. The system of claim 11, wherein the inflatable bladder is configured to transition from the pressurized state to the unpressurized state based at least in part on one or more received instructions from an electronic device distinct from the wearable device.

13. The system of claim 11, wherein depression of the inflatable bladder provides tactile feedback to a user of the wearable device.

14. The system of claim 11, wherein the wearable device further comprises a display, and executing the command includes modifying a user interface displayed on the display.

15. The system of claim 12, wherein the wearable device is further configured to:
    send, to an electronic device distinct from the wearable device, an indication that the magnitude of depression satisfies the predetermined threshold.

16. The system of claim 12, wherein the wearable device is further configured to:
  generate, by the sensor, sensor data based on the detecting; and
  store, in a memory of the wearable device, the generated sensor data.

17. The system of claim 16, wherein the sensor data includes one or more of: (i) measurements of the inflatable bladder's expansion, (ii) measurements of the bladder's contraction, and (iii) measurements of fluid pressure within the bladder.

18. The system of claim 11, wherein transitioning the inflatable bladder from the unpressurized state to the pressurized state is in response to receiving an instruction from an electronic device distinct from the wearable device.

19. The system of claim 18, wherein pressurizing the inflatable bladder includes adding fluid to the inflatable bladder to increase fluid pressure of the inflatable bladder.

20. A system comprising:
  an electronic device, configured to transmit one or more instructions; and
  a wearable device comprising (i) a wearable structure attachable to a portion of a user's body, (ii) an inflatable bladder integrated with the wearable structure along an axis, and (iii) a sensor integrated with the inflatable bladder, wherein the sensor comprises an upper component and a lower component, wherein the upper component and lower component are substantially perpendicular to the axis, and wherein the wearable device is distinct from the electronic device and the inflatable bladder is configured to:
  transition from an unpressurized state to a pressurized state, wherein the inflatable bladder is associated with an executable command when in the pressurized state;
  detect, by the sensor, a magnitude of depression of the inflatable bladder, wherein the magnitude of depression comprises a distance of separation between the longitudinally upper component and the longitudinally lower component to the wearable device;
  determine whether the magnitude of depression satisfies a predetermined distance threshold; and
  in accordance with determining that the magnitude of depression satisfies the predetermined distance threshold, executing the executable command.

* * * * *